US011470206B2

(12) United States Patent
Hitaka

(10) Patent No.: US 11,470,206 B2
(45) Date of Patent: Oct. 11, 2022

(54) IMAGE FORMING APPARATUS AND DIAGNOSTIC SYSTEM INCREASING FREQUENCY OF ACQUIRING DIAGNOSTIC DATA

(71) Applicant: Konica Minolta, Inc., Tokyo (JP)

(72) Inventor: Masatoshi Hitaka, Toyokawa (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 17/557,470

(22) Filed: Dec. 21, 2021

(65) Prior Publication Data

US 2022/0116503 A1 Apr. 14, 2022

Related U.S. Application Data

(63) Continuation of application No. 16/945,244, filed on Jul. 31, 2020, now Pat. No. 11,310,370.

(30) Foreign Application Priority Data

Jul. 31, 2019 (JP) .............................. JP2019-141637

(51) Int. Cl.
*H04N 1/00* (2006.01)
*G06F 11/30* (2006.01)
(Continued)

(52) U.S. Cl.
CPC ..... *H04N 1/00029* (2013.01); *G06F 11/3013* (2013.01); *G06F 11/324* (2013.01); (Continued)

(58) Field of Classification Search
CPC .......... H04N 1/00015; H04N 1/00029; H04N 1/00034; H04N 1/00037; H04N 1/00039;
(Continued)

(56) References Cited

U.S. PATENT DOCUMENTS 10,257,382 B2 * 4/2019 Yasunaga ........... H04N 1/33323
11,316,984 B2 * 4/2022 Hitaka ................. H04N 1/0009
(Continued)

FOREIGN PATENT DOCUMENTS

JP 2017216654 A * 12/2017

*Primary Examiner* — Scott A Rogers
(74) *Attorney, Agent, or Firm* — Osha Bergman Watanabe & Burton LLP

(57) ABSTRACT

An image forming apparatus includes: an image former that executes image forming processing; a primary controller; a secondary controller that controls the image former; a sensor that detects a state of at least a unit of the image forming apparatus and transmits sensor data indicating the state to the secondary controller; a first transmission path for duplex communication between the primary and secondary controllers; and a second transmission path. The secondary controller: generates, from the sensor data, diagnostic data for failure diagnostics or life prediction, transmits data other than the diagnostic data to the primary controller via the first transmission path and transmits the diagnostic data to the diagnostic server via the second transmission path, or transmits data other than the sensor data to the primary controller via the first transmission path and transmits the sensor data to the diagnostic server via the second transmission path.

21 Claims, 28 Drawing Sheets

(51) Int. Cl.
*G06F 11/32* (2006.01)
*G06F 11/34* (2006.01)

(52) U.S. Cl.
CPC ....... *G06F 11/3495* (2013.01); *H04N 1/0005* (2013.01); *H04N 1/00015* (2013.01); *H04N 1/00055* (2013.01); *H04N 1/00061* (2013.01); *H04N 1/00068* (2013.01); *H04N 1/00079* (2013.01); *H04N 1/00244* (2013.01); *H04N 1/00315* (2013.01); *H04N 1/00323* (2013.01); *H04N 2201/0094* (2013.01)

(58) Field of Classification Search
CPC ............. H04N 1/00042; H04N 1/0005; H04N 1/00055; H04N 1/00058; H04N 1/00061; H04N 1/00068; H04N 1/00079; H04N 1/00244; H04N 1/00323; H04N 1/2346; H04N 1/32609–32641; H04N 2201/0094; G06K 15/408–409; G06F 3/121; G06F 3/1234; G06F 3/1235; G06F 3/1279; G06F 11/3013; G06F 11/324; G06F 11/3495
See application file for complete search history.

(56) References Cited

U.S. PATENT DOCUMENTS

2019/0056899 A1* 2/2019 Fukuoka .............. G06F 3/1236
2020/0379694 A1* 12/2020 Shiraga ................ G06F 3/1256
2021/0081733 A1* 3/2021 Hitaka ................. G06K 15/408

* cited by examiner

FIG. 8

| Image forming apparatus #1 ||
|---|---|
| Reception date/time | Sheet arrival period (ms) |
| 2018/5/10/10:00:00 | 250 |
| 2018/5/10/10:00:01 | 251 |
| 2018/5/10/10:00:02 | 250 |
| 2018/5/10/10:00:03 | 270 |
| 2018/5/10/10:00:06 | 250 |
| ... | ... |
| 2018/12/01/15:00:10 | 260 |
| Image forming apparatus #2 ||
| Reception date/time | Sheet arrival period (ms) |
| 2018/5/12/11:00:10 | 250 |
| 2018/5/12/11:05:01 | 248 |
| 2018/5/15/09:00:12 | 252 |
| 2018/5/15/09:01:12 | 252 |
| 2018/5/15/09:01:20 | 252 |
| ... | ... |
| 2018/5/20/09:00:00 | 251 |
| Image forming apparatus #3 ||
| Reception date/time | Sheet arrival period (ms) |
| ... | ... |

← Received data of suddenly extended period

FIG. 16A
Example of sheet arrival period T and mean value

| Sheet count | Sheet arrival period (ms) |
|---|---|
| 1 | 262 |
| 2 | 262 |
| 3 | 260 |
| Mean value | 261.3 |

⇐ Sent data

FIG. 16B
Example of diagnostic data accumulated in diagnostic server 101

| Image forming apparatus #1 | |
|---|---|
| Reception date/time | Sheet arrival period (ms) |
| 2018/5/10/10:00:02 | 250.0 |
| 2018/5/10/10:00:21 | 251.1 |
| 2018/5/10/10:00:52 | 250.3 |
| ... | ... |
| 2018/12/01/15:00:10 | 261.3 |
| Image forming apparatus #2 | |
| Reception date/time | Sheet arrival period (ms) |
| 2018/5/12/11:00:10 | 250.1 |
| 2018/5/12/11:05:01 | 248.0 |
| 2018/5/15/09:00:12 | 252.0 |
| ... | ... |
| 2018/5/20/09:00:00 | 251 |
| Image forming apparatus #3 | |
| Reception date/time | Sheet arrival period (ms) |
| ... | ... |

⇐ Latest received data

Case of recording sheet sliding

| Sheet count | Sheet arrival period (ms) |
|---|---|
| 1 | 262 |
| 2 | 262 |
| 3 | 280 |
| Mean value | 268.0 |

← Data of recording sheet sliding

Case of no recording sheet sliding

| Sheet count | Sheet arrival period (ms) |
|---|---|
| 1 | 262 |
| 2 | 262 |
| 3 | 260 |
| Mean value | 261.3 |

FIG. 19A
Example of sheet arrival period T and mean value

| Sheet count | Sheet arrival period (ms) | Mean value (ms) |
|---|---|---|
| 1 | 260 | |
| 2 | 262 | 261.0 |
| 3 | 261 | |
| 1 | 262 | |
| 2 | 262 | 261.3 |
| 3 | 260 | |

FIG. 19B
Example of diagnostic data

| Diagnostic data format | Diagnostic data |
|---|---|
| Mean value | 261.0 |
| Mean value | 261.3 |

FIG. 19C
Example of diagnostic data accumulated in diagnostic server 101

| Image forming apparatu #1 | |
|---|---|
| Reception date/time | Sheet arrival period (ms) |
| 2018/5/10/10:00:02 | 250.0 |
| 2018/5/10/10:00:21 | 251.1 |
| 2018/5/10/10:00:52 | 250.3 |
| ... | ... |
| 2018/12/01/15:00:10 | 261.3 ⇐ Latest received data |
| Image forming apparatus #2 | |
| Reception date/time | Sheet arrival period (ms) |
| ... | ... |

FIG. 21A

Example of sheet arrival period T and mean value

| Sheet count | Sheet arrival period (ms) | ID |
|---|---|---|
| 1 | 262 | 1 |
| 2 | 262 | 1 |
| ... | ... | ... |
| 100 | 260 | 1 |
| Mean value | 261.3 | 1 |
| 1 | 262 | 2 |
| 2 | 262 | 2 |
| ... | ... | ... |
| 100 | 260 | 2 |
| Mean value | 261.3 | 2 |

FIG. 21B

Example of diagnostic data

| Sheet arrival period (ms) | ID |
|---|---|
| 260 | 2 |

| Mean value (ms) | ID |
|---|---|
| 261.3 | 2 |

FIG. 21C

Example of diagnostic data accumulated in diagnostic server 101

| Reception date/time | Image forming apparatus #1 | | | |
|---|---|---|---|---|
| | Secondary controller | | Primary controller | |
| | Sheet arrival period (ms) | ID | Mean value (ms) | ID |
| 2018/5/10/10:00:02 | 250 | 1 | | |
| 2018/5/10/10:00:21 | 251 | 1 | | |
| 2018/5/10/10:00:52 | 250 | 1 | | |
| ... | ... | ... | ... | ... |
| 2018/12/01/15:00:09 | 261 | 2 | | |
| 2018/12/01/15:00:10 | 260 | 2 | | |
| 2018/12/01/15:00:10 | | | 261.3 | 2 |

Operations of image forming apparatus 100

Main configuration of secondary controller 200 and primary controller 201

FIG. 24A
Example of sheet arrival period T and mean value

| Sheet count | Sheet arrival period (ms) | ID |
|---|---|---|
| 1 | 262 | 1 |
| 2 | 262 | 1 |
| ... | ... | ... |
| 100 | 260 | 1 |
| Sheet count | 261.3 | 1 |
| 1 | 262 | 2 |
| 2 | 262 | 2 |
| ... | ... | ... |
| 100 | 260 | 2 |
| Sheet count | 261.3 | 2 |

FIG. 24B
Example of diagnostic data sent to diagnostic server 101

| Sheet arrival period (ms) | ID | Sheet count |
|---|---|---|
| 260 | 2 | 100 |

FIG. 24C
Example of diagnostic data sent to parent diagnostic server 2201

| Mean value (ms) | ID |
|---|---|
| 261.3 | 2 |

FIG. 24D
Example of diagnostic data accumulated in diagnostic server 101

| Image forming apparatus #1 | | |
|---|---|---|
| Reception date/time | Secondary controller | |
| | Sheet arrival period (ms) | ID |
| 2018/5/10/10:00:02 | 250 | 1 |
| 2018/5/10/10:00:21 | 251 | 1 |
| 2018/5/10/10:00:52 | 250 | 1 |
| ... | ... | ... |
| 2018/12/01/15:00:09 | 261 | 2 |
| 2018/12/01/15:00:10 | 260 | 2 |

FIG. 25A

Example of data sent from diagnostic server 101 to parent diagnostic server 2201

| Diagnostics result (lifespan days) | ID | Sheet count | Apparatus IP address |
|---|---|---|---|
| 105 | 2 | 100 | IP_a.b.c.d |

FIG. 25B

Example of diagnostic data accumulated in parent diagnostic server 2201

| Reception date/time | Diagnostic server | | | | Image forming apparatus (IP_a.b.c.d) | |
|---|---|---|---|---|---|---|
| | Lifespan days | ID | Sheet count | Apparatus IP address | Sheet arrival period (ms) | ID |
| 2018/5/08/10:00:02 | | | | | 250.1 | 1 |
| 2018/5/09/10:00:00 | 1130 | 1 | 27 | IP_a.b.c.d | | |
| 2018/5/10/10:00:02 | | | | | 250.1 | 2 |
| 2018/5/11/12:00:21 | | | | | 251.0 | 3 |
| 2018/5/13/10:00:52 | | | | | 250.0 | 4 |
| 2018/5/15/10:00:52 | | | | | 250.2 | 5 |
| 2018/5/16/10:00:00 | 1128 | 5 | 98 | IP_a.b.c.d | | |
| ... | ... | ... | ... | ... | ... | ... |
| 2018/12/04/15:00:10 | | | | | 261.3 | 2 |
| 2018/12/05/00:00:00 | 900 | 2 | 60 | IP_a.b.c.d | | |

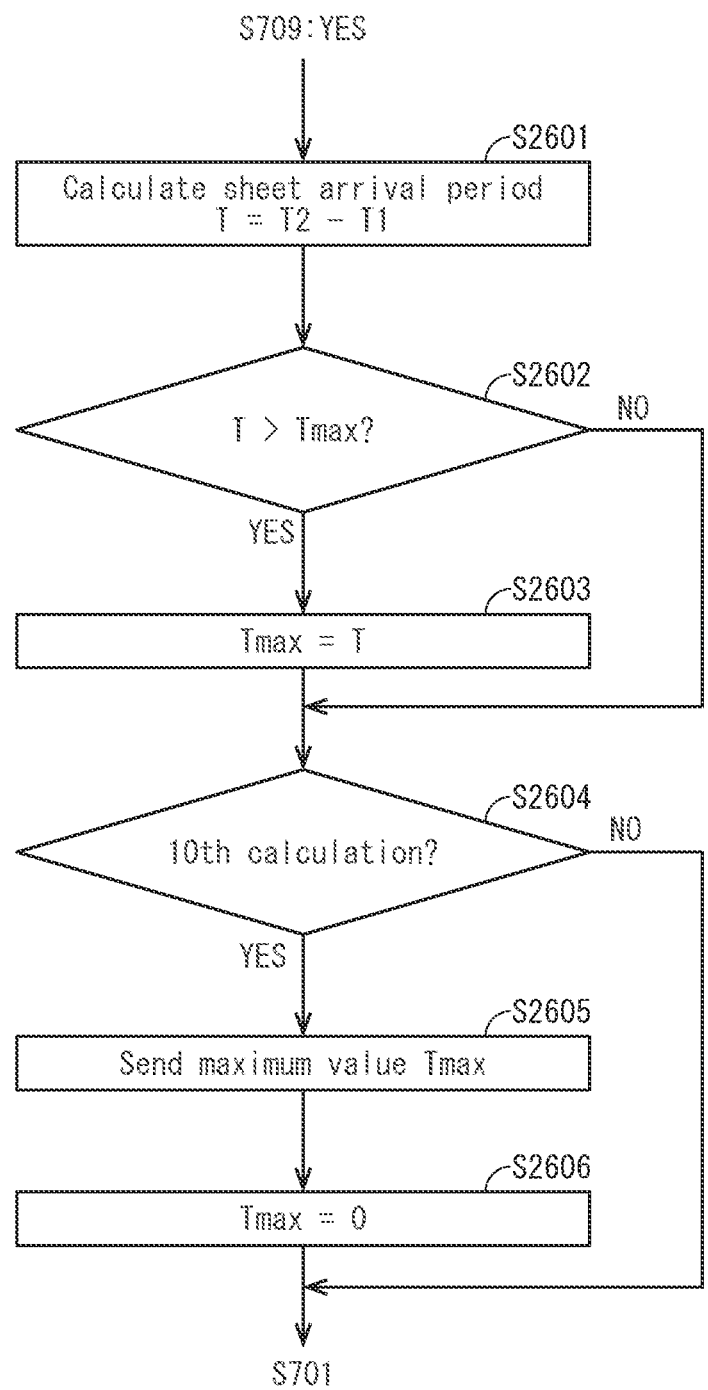

FIG. 27A

Example of sheet arrival period T and maximum value

| Sheet count | Sheet arrival period (ms) |
|---|---|
| 1 | 262 |
| 2 | 262 |
| 3 | 260 |
| ... | ... |
| 8 | 260 |
| 9 | 261 |
| 10 | 261 |
| Maximum value | 262 |

FIG. 27B

Example of diagnostic data sent to diagnostic server 101

| Sheet arrival period (ms) | Format (0: per piece, 1: maximum per 10 pieces) |
|---|---|
| 262 | 1 |

FIG. 27C

Example of diagnostic data accumulated in diagnostic server 101

| Image forming apparatus #1 | | |
|---|---|---|
| Reception date/time | Sheet arrival period (ms) | Format |
| 2018/5/10/10:00:02 | 250 | 1 |
| 2018/5/10/10:00:21 | 251 | 1 |
| 2018/5/10/10:00:52 | 250 | 1 |
| ... | ... | ... |
| 2018/12/01/15:00:10 | 262 | 1 |
| Image forming apparatus #2 | | |
| Reception date/time | Sheet arrival period (ms) | Format |
| ... | ... | ... |

FIG. 28A
Example of sheet arrival period T and minimum value

| Sheet count | Sheet arrival period (ms) |
|---|---|
| 1 | 262 |
| 2 | 262 |
| 3 | 260 |
| ... | ... |
| 8 | 260 |
| 9 | 261 |
| 10 | 261 |
| Minimum value | 260 |

FIG. 28B
Example of diagnostic data sent to diagnostic server 101

| Sheet arrival period (ms) | Format (0: per piece, 1: minimum per 10 pieces) |
|---|---|
| 260 | 1 |

FIG. 28C
Example of diagnostic data accumulated in diagnostic server 101

| Image forming apparatus #1 | | |
|---|---|---|
| Reception date/time | Sheet arrival period (ms) | Format |
| 2018/5/10/10:00:02 | 250 | 1 |
| 2018/5/10/10:00:21 | 251 | 1 |
| 2018/5/10/10:00:52 | 250 | 1 |
| ... | ... | ... |
| 2018/12/01/15:00:10 | 260 | 1 |
| Image forming apparatus #2 | | |
| Reception date/time | Sheet arrival period (ms) | Format |
| ... | ... | ... |

IMAGE FORMING APPARATUS AND DIAGNOSTIC SYSTEM INCREASING FREQUENCY OF ACQUIRING DIAGNOSTIC DATA

CROSS-REFERENCE TO RELATED APPLICATIONS

This application claims priority to Japanese Patent Application No. 2019-141637 filed on Jul. 31, 2019, the contents of which are hereby incorporated herein by reference in their entirety.

BACKGROUND

Technical Field

The present disclosure relates to an image forming apparatus and an image forming apparatus diagnostic system, and particularly to a technique of increasing a frequency of acquiring diagnostic data to improve the precision of image forming apparatus diagnostics.

Related Art

One conventional system uses diagnostic servers to remotely perform failure diagnostics and lifespan diagnostics of image forming apparatuses. Such image forming apparatuses each include a secondary controller that performs mechanical control for image forming processing and a primary controller that receives a job from a user and instructs the secondary controller to perform the image forming processing. The secondary controller acquires sensor data by referring to values outputted from various sensors, and the primary controller sends the sensor data to a diagnostic server. The diagnostic server uses this sensor data to perform failure diagnostics and lifespan diagnostics.

The sensor data is sent from the secondary controller to the primary controller via a communication path which is also used for sending operation instructions and modes from the primary controller to the secondary controller. To meet the recent demand for real-time performance, a delay is impermissible in communications for sending operation instructions and modes from the primary controller to the secondary controller and modes. Nevertheless, an excessive amount of sending sensor data might cause a delay in communications for sending operation instructions and modes.

Assume for example that each time image formation is performed on one sheet, 200 bytes of data are sent and received between the primary controller and the secondary controller. In this case, image formation on 1,000 sheets per day results in sending and reception of 200 kilobytes of data per day between the primary controller and the secondary controller. Thus, image formation on 3,000 sheets, which are three times 1,000 sheets, per day results in an amount of sending and receiving 600 kilobytes of data, which are accordingly three times 200 kilobytes of data, per day.

Also, such data sending and reception is not evenly dispersed over 24 hours but is commonly intensive in a specific time zone among 24 hours. It thus is inevitable that a communication load increases between the primary controller and the secondary controller in such a specific time zone.

For this reason, if sensor data is frequently sent via a communication path which also serves as a path for sending and receiving data for image formation, a risk occurs that, though depending on time zone, communication for image forming processing might be delayed and thus the image forming processing might be delayed, and also image quality might deteriorate.

In response to this problem, the secondary controller calculates at least one of a mean value, a maximum value, and a minimum value of sensor data and sends only the calculated value to the primary controller, thereby to suppress an amount of sending sensor data. This achieves smooth communications for other purposes such as operation instructions and modes with no delay.

However, if a large number of sensor data samples are used to calculate a mean value, a sample value indicating a suddenly increased or decreased value might be hidden by normal samples and thus become difficult to find. Meanwhile, the maximum value and the minimum value are calculated for each time period of a certain length. Thus, although it is true that sensor data indicating a sudden increase or decrease is sent to the diagnostic server, it is impossible to send sufficient information indicating a time and frequency of such a sudden increase or decrease has occurred. For the reasons above, the use of at least one of the mean value, the maximum value, and the minimum value must have limits to an improvement of the precision of failure diagnostics and lifespan diagnostics performed by the diagnostic server.

On the other hand, sending of all pieces of sensor data to the diagnostic server might hinder communications for other purposes such as image forming operation instructions and modes as above. Furthermore, if receiving all pieces of sensor data from the secondary controller, the primary controller has excessive processing loads and thus might delay other processing.

SUMMARY

One or more embodiments of the present invention provide an image forming apparatus and an image forming apparatus diagnostic system which improve the precision of failure diagnostics and lifespan diagnostics without hindering processing of the image forming apparatus.

According to one or more embodiments, an image forming apparatus sends diagnostic data or sensor data to a diagnostic server. The image forming apparatus comprises: an image former that executes image forming processing to form an image on a sheet; a primary controller; a secondary controller that controls the image former, wherein the primary controller instructs the secondary controller to execute the image forming processing; a sensor that detects a state of at least a unit of the image forming apparatus and transmits sensor data indicating the state to the secondary controller; a first transmission path for duplex communication between the secondary controller and the primary controller; and a second transmission path different from the first transmission path. The secondary controller: generates, from the sensor data, diagnostic data for failure diagnostics or life prediction relating to the image forming apparatus, transmits data other than the diagnostic data to the primary controller via the first transmission path, and transmits the diagnostic data to the diagnostic server, without relaying via the primary controller, via the second transmission path, or transmits data other than the sensor data to the primary controller via the first transmission path, and transmits the sensor data to the diagnostic server, without relaying via the primary controller, via the second transmission path.

BRIEF DESCRIPTION OF THE DRAWINGS

The advantages and features provided by one or more embodiments will become more fully understood from the detailed description given hereinbelow and the appended drawings which are given by way of illustration only, and thus are not intended as a definition of the limits of the invention.

In the drawings:

FIG. 8 is a table exemplifying a sheet arrival period T and its reception date and time according to one or more embodiments;

FIG. 16A is a table exemplifying the sheet arrival period T and a mean value of sheet arrival periods T, and FIG. 16B is a table exemplifying diagnostic data accumulated in a diagnostic server 101 according to one or more embodiments;

FIG. 19A is a table exemplifying the sheet arrival period T and the mean value of sheet arrival periods T, FIG. 19B is a table exemplifying diagnostic data, and FIG. 19C is a table exemplifying diagnostic data accumulated in a diagnostic server 101 according to one or more embodiments;

FIG. 21A is a table exemplifying the sheet arrival period T and the mean value of sheet arrival periods T, FIG. 21B is a table exemplifying the sheet arrival period T and the mean value of sheet arrival periods T sent as diagnostic data to a diagnostic server 101, and FIG. 21C is a table exemplifying diagnostic data accumulated in the diagnostic server 101 according to one or more embodiments;

FIG. 24A is a table exemplifying the sheet arrival period T and the mean value of sheet arrival periods T, FIG. 24B is a table exemplifying the sheet arrival period T sent as diagnostic data to a diagnostic server 101, FIG. 24C is a table exemplifying the mean value sent as diagnostic data to a parent diagnostic server 2201, and FIG. 24D is a table exemplifying diagnostic data accumulated in the diagnostic server 101 according to one or more embodiments;

FIG. 25A is a table exemplifying data sent from the diagnostic server 101 to the parent diagnostic server 2201, and FIG. 25B is a table exemplifying diagnostic data accumulated in the parent diagnostic server 2201 according to one or more embodiments;

FIG. 26 is a flowchart describing operations of a secondary controller 200 according to a tenth embodiment;

FIG. 27A is a table exemplifying the sheet arrival period T and its maximum value, FIG. 27B is a table exemplifying the maximum value sent as diagnostic data to a diagnostic server 101, and FIG. 27C is a table exemplifying diagnostic data accumulated in the diagnostic server 101 according to one or more embodiments; and FIG. 28A is a table exemplifying the sheet arrival period T and its minimum value, FIG. 28B is a table exemplifying the minimum value sent as diagnostic data to the diagnostic server 101, and FIG. 28C is a table exemplifying diagnostic data accumulated in the diagnostic server 101 according to one or more embodiments.

DETAILED DESCRIPTION

Hereinafter, an image forming apparatus and an image forming apparatus diagnostic system according to one or more embodiments of the present invention will be described with reference to the drawings. However, the scope of the invention is not limited to the disclosed embodiments.

[1] First Embodiment

The following describes an image forming apparatus diagnostic system according to a first embodiment.

(1-1) Configuration of Image Forming Apparatus Diagnostic System

Firstly, description is given on the configuration of the image forming apparatus diagnostic system.

Figure 1:
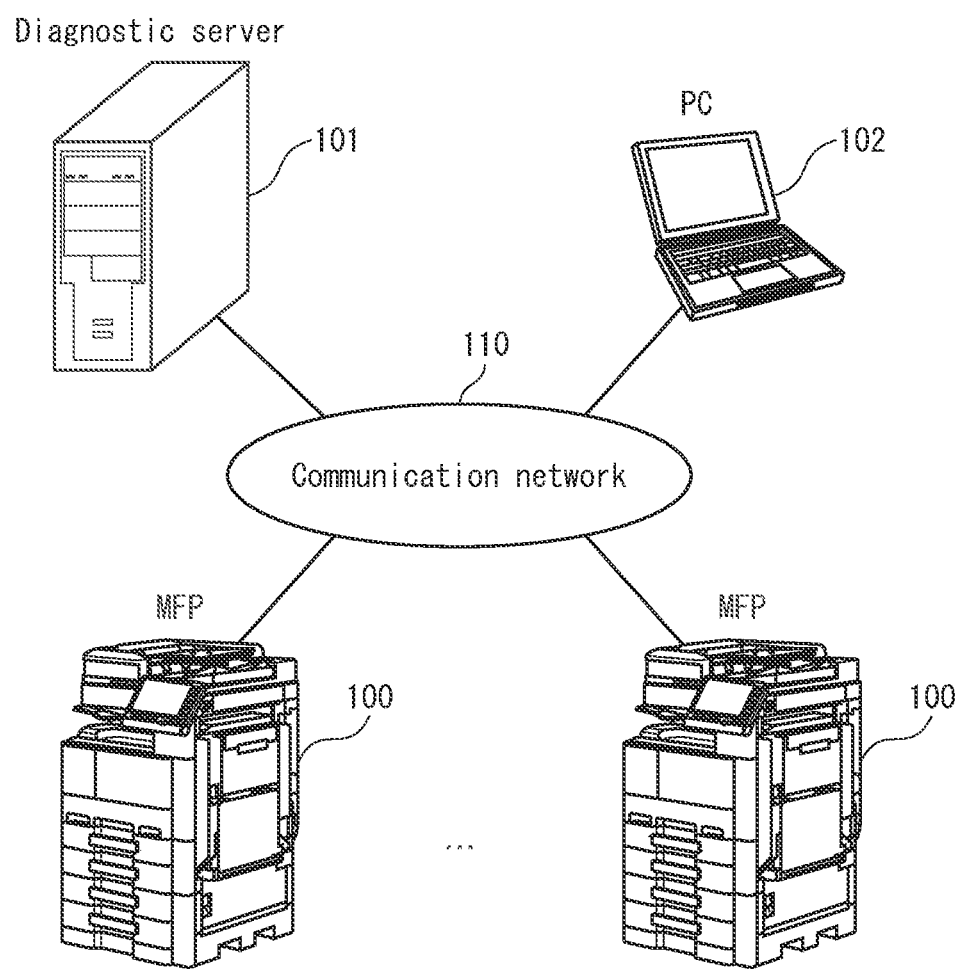
FIG. 1 shows main components of an image forming apparatus diagnostic system 1 according to a first embodiment.

As shown in FIG. 1, the image forming apparatus diagnostic system 1 comprises image forming apparatuses 100, a diagnostic server 101 which also serves as a management server for image forming apparatuses, and a personal computer (PC) 102 which are connected to each other via a communication network 110. The communication network 110 may be a local area network (LAN) or may be configured from both a LAN and the Internet.

The image forming apparatuses 100 are each a so-called tandem-type multi-function peripheral (MFP) including various sensors and sending values outputted from the sensors (sensor data) to the diagnostic server 101 via the communication network 110. The diagnostic server 101 accumulates therein the sensor data thus received and performs failure diagnostics of specifying a failure site in the image forming apparatus 100 and performs lifespan diagnostics for each part of the image forming apparatus 100. By analyzing sensor data and feeding an analysis result back to algorithms for failure diagnostics and lifespan diagnostics, it is possible to improve the precision of failure diagnostics and lifespan diagnostics. This analysis may be performed by either the diagnostic server 101 automatically or by users. The PC 102 sends a print job to the image forming apparatus 100 to cause the image forming apparatus 100 to perform image forming processing.

(1-2) Configuration of Image Forming Apparatuses 100

Next, description is given on the image forming apparatuses 100.

Figure 2:
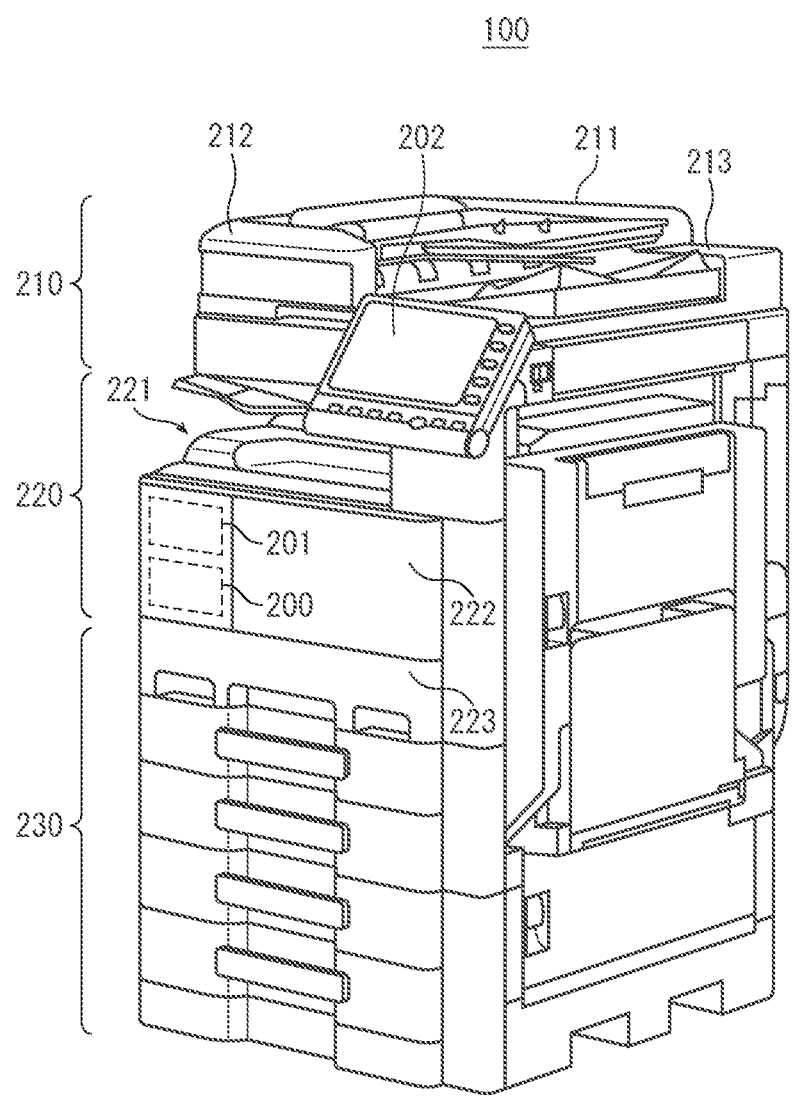
FIG. 2 is an external perspective view of an image forming apparatus 100 according to one or more embodiments.

As shown in FIG. 2, the image forming apparatuses 100 each include an image scanning unit 210, a main unit 220, and a feed unit 230, and further include a secondary controller 200 and a primary controller 201 for controlling these units 210, 220, and 230. The main unit 220 and the feed unit 230 are collectively called an image forming unit. When employing a sheet-through system to scan documents to generate image data, the image scanning unit 210 conveys documents stacked on a document tray 211 piece by piece with use of an automatic document feeder (ADF) 212. The documents after scanning are ejected onto an eject tray 213.

Upon receiving a print job from the PC 102 via the communication network 110, the primary controller 201 instructs the secondary controller 200 to execute the print job. The primary controller 201 may also instruct the secondary controller 200 to control the feed unit 230 to feed recording sheets and to control the main unit 220 to perform image forming processing with use of image data generated by the image scanning unit 210.

Upon being instructed by the primary controller 201, the secondary controller 200 controls the main unit 220 and the feed unit 230 to perform image forming processing. Also, the secondary controller 200 acquires values outputted from various sensors of the main unit 220 and the feed unit 230 (hereinafter, referred to as sensor data), and sends the acquired sensor data directly to the diagnostic server 101 without relaying via the primary controller 201.

Although one or more embodiments describe the example where the main unit 220 is a so-called tandem-type color printer, either another-type color printer or a monochrome printer may be employed instead.

The feed unit 230 feeds recording sheets of a type designated by a user of the image forming apparatus 100 via a print job or an operation panel 202, such that the main unit 220 performs image forming processing. In the one or more embodiments, the feed unit 230 comprises two feed trays at different levels for housing recording sheets. However, any number of feed trays may be included, such as one or three or more.

The main unit 220 comprises a toner cartridge door cover 222 and a front cover 223. The toner cartridge door cover 222 is opened to mount and remove toner cartridges of yellow (Y), magenta (M), cyan (C), and black (K) colors. The front cover 223 is opened to access a power switch. The toner cartridge door cover 222 and the front cover 223 each include a sensor for sensing an open and closed state of the cover, as described later.

(1-3) Configuration of Primary Controller 201

Next, description is given on the configuration of the primary controller 201.

Figure 4:
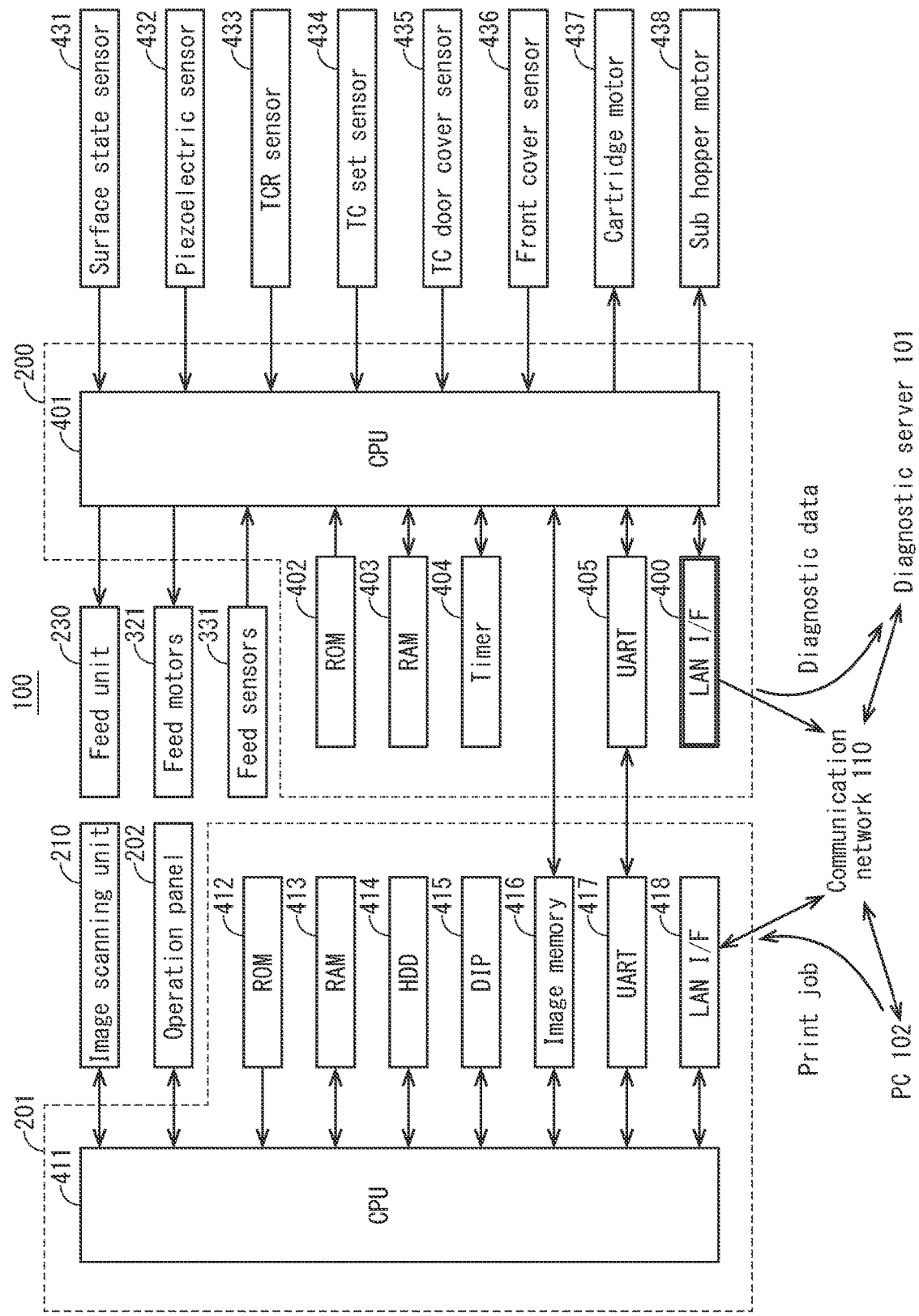
FIG. 4 is a block diagram showing main components of a secondary controller 200 and a primary controller 201 according to one or more embodiments.

As shown in FIG. 4, the primary controller 201 comprises a central processing unit (CPU) 411, a read only memory (ROM) 412, a random access memory (RAM) 413, and so on. Upon being reset, the CPU 411 reads a boot program from the ROM 412 to boot up, and executes an operating system (OS) and an application program read from a hard disk drive (HDD) 414 with use of the RAM 413 as a working memory.

A LAN interface 418 performs processing for enabling the primary controller 201 to communicate with the PC 102 and other devices via the communication network 110. An image memory 416 is a storage for storing image data generated by the image scanning unit 210 and image data received from devices such as the PC 102. The secondary controller 200 can read image data stored in the image memory 416.

A digital image processing (DIP) unit 415 performs image processing on image data stored in the image memory 416. This image processing is for example bitmap expansion processing of converting image data into a bitmap format. A universal asynchronous receiver transmitter (UART) 417 performs serial communication to instruct the secondary controller 200 to perform image forming processing, and also performs communication to acquire information on paper jam and the open and closed state of the covers from the secondary controller 200.

By executing an application program, the primary controller 201 receives a print job from the PC 102, stores print data relevant to the print job onto the image memory 416, and performs image processing such as image processing on the print data by the DIP unit 415 and image processing on image data generated by the image scanning unit 210.

Also, the primary controller 201 controls the operation panel 202 to display information to the user of the image forming apparatus 100 and receive an operation input from the user.

(1-4) Configuration of Secondary Controller 200

Next, description is given on the configuration of the secondary controller 200.

As shown in FIG. 4, the secondary controller 200 includes a CPU 401, a ROM 402, a RAM 403, and so on. Upon being reset, the CPU 401 reads a boot program from the ROM 402 to boot up, and executes a control program read from the ROM 402 with use of the RAM 403 as a working memory. The CPU 401 refers to a timer 404 to acquire a current time. Also, the CPU 401 can read image data stored in the image memory 416 of the primary controller 201, as described above. The UART 405 (first transceiver) performs serial communication with the primary controller 201.

The CPU 401 includes a LAN interface 400 (second transceiver). The CPU 401 connects to the communication network 110 by the LAN interface 400 to send diagnostic data to the diagnostic server 101 via the communication network 110. The diagnostic data includes both sensor data, which indicates values outputted from the various sensors, and data obtained by processing the sensor data. With the configuration above, the secondary controller 200 sends diagnostic data directly to the diagnostic server 101 without relaying via the primary controller 201.

(1-5) Sheet Arrival Period T Sensing Processing

The following describes processing of sensing a sheet arrival period T as an example of diagnostic data.

The sheet arrival period T indicates a time period required for a recording sheet during image formation to arrive at a predefined target position from a predefined start position on a conveyance path.

Figure 3:
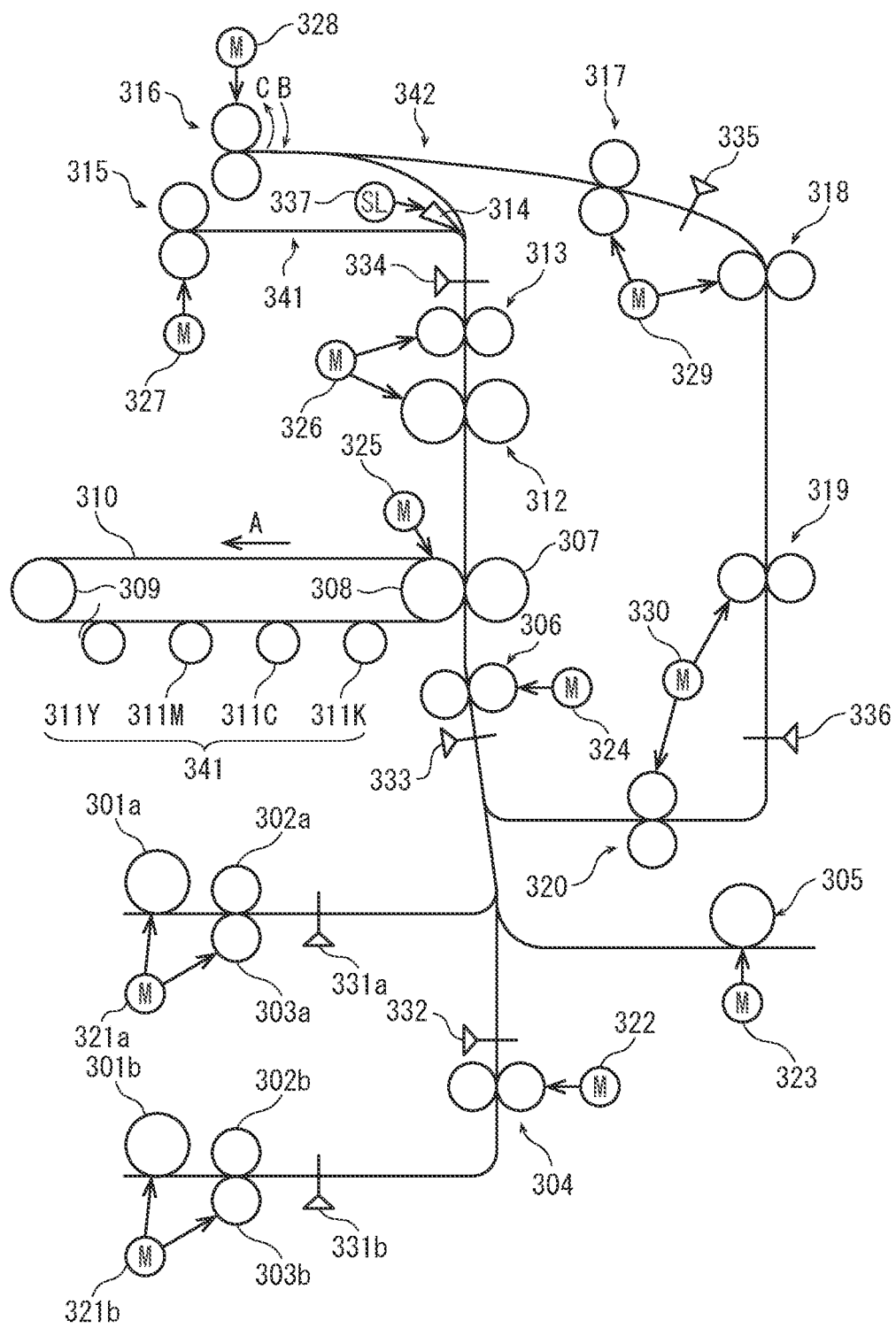
FIG. 3 describes a conveyance path of recording sheets in the image forming apparatus 100 according to one or more embodiments.

Image forming processing is performed for example on recording sheets housed in the 1st-level feed tray as follows. As shown in FIG. 3, a 1st-level pickup roller 301a picks up the top one of the recording sheets housed in the 1st-level feed tray, and the 1st-level feed roller 302a feeds the top recording sheet onto the conveyance path while a 1st-level separation roller 303a prevents overlapping of a recording sheet below the top recording sheet.

Upon sensing the leading edge of the recording sheet fed by the 1st-level feed roller 302a, a 1st-level feed sensor 331a switches an output signal from ON to OFF. The secondary controller 200 thus senses a time T1a at which the 1st-level feed sensor 331a has sensed the recording sheet.

Then, the recording sheet is guided to a sensing position of a timing sensor 333 by a conveyance guide which is not illustrated. Upon sensing the leading edge of the recording sheet, the timing sensor 333 switches an output signal from ON to OFF. The secondary controller 200 thus senses a time T2b at which the timing sensor 333 has sensed the recording sheet, calculates a sheet arrival period T from the time T1a to the time T2b, and sends the calculated value as sensor data to the diagnostic server 101.

Figure 7:
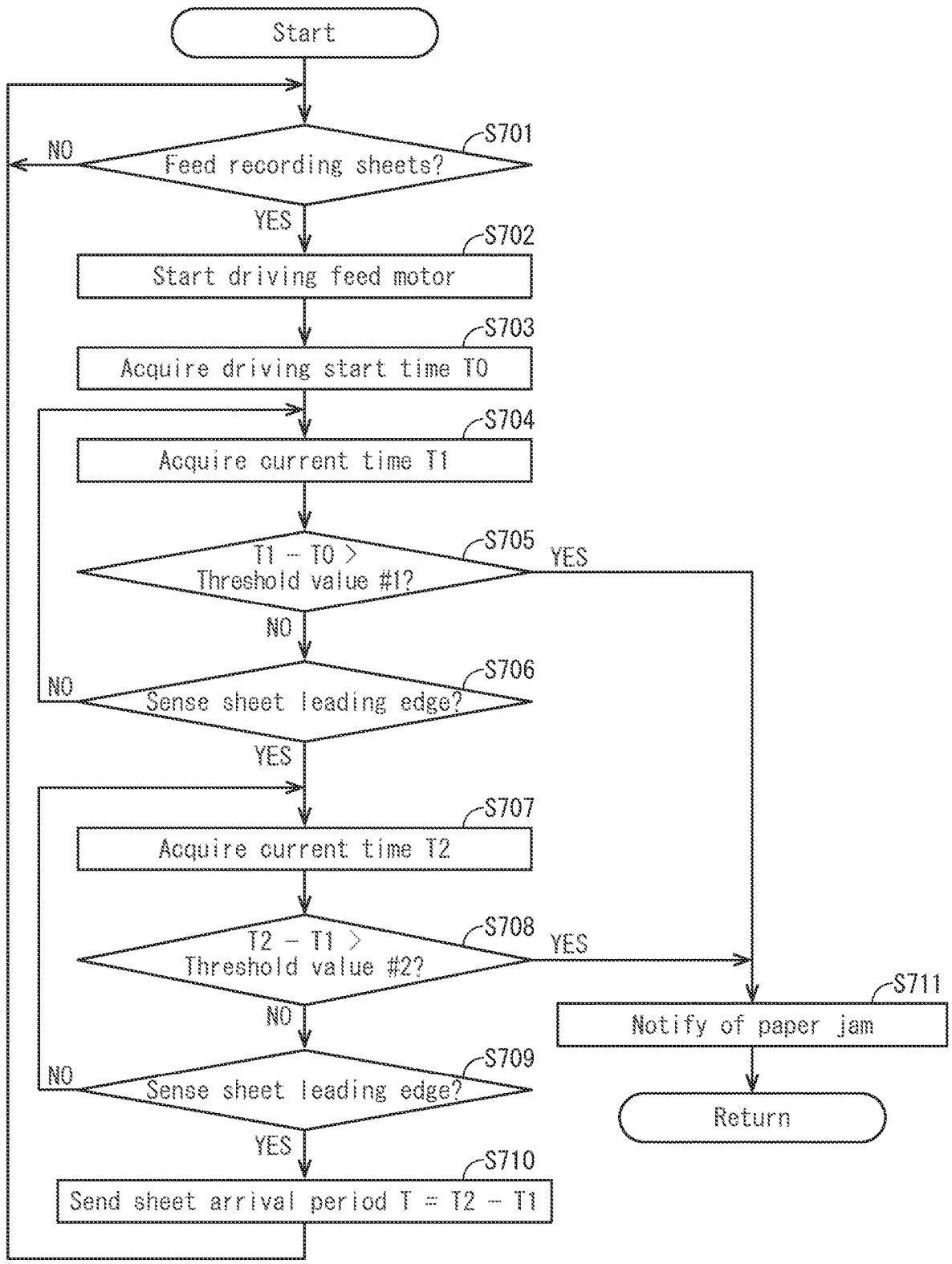
FIG. 7 is a flowchart describing operations of the secondary controller 200 according to one or more embodiments.

Processing in this case performed by the secondary controller 200 is detailed as follows. As shown in FIG. 7, to feed recording sheets (S701: YES), the secondary controller 200 starts driving a feed motor 321a which corresponds to the 1st-level feed tray (S702), and refers to the timer 404 to acquire the current time as a driving start time T0 (S703).

Then, the secondary controller 200 refers to the timer 404 to acquire a current time T1 (S704). In the case where a period (T1−T0) elapsed from the driving start time T0 to the current time T1 exceeds a predefined threshold value #1 (S705: YES), the secondary controller 200 determines that the leading edge of the recording sheet has not arrived at the feed sensor 331a and a paper jam has occurred. Thus the secondary controller 200 notifies the primary controller 201 of occurrence of the paper jam (S711).

Upon being notified of the occurrence of the paper jam, the primary controller 201 displays the notification on the operation panel 202 to the user of the image forming apparatus 100. The secondary controller 200 may further notify the diagnostic server 101 of the occurrence of the paper jam.

In the case where the feed sensor 331a senses the leading edge of the recording sheet (S706: YES) before the period (T1−T0) elapsed from the driving start time exceeds the threshold value #1 (S705: NO), the secondary controller 200 stores therein the current time T1, at which the feed sensor 331a has sensed the leading edge of the recording sheet. Then, the flow proceeds to the next processing.

That is, the secondary controller 200 acquires a current time T2 (S707). The secondary controller 200 calculates a period (T2−T1) elapsed since the leading edge of the recording sheet has been sensed by the feed sensor 331a. In the case where the period (T2−T1) exceeds a predefined threshold value #2 (S708: YES), the secondary controller 200 determines that the leading edge of the recording sheet fed from the 1st-level feed tray has not arrived at the timing sensor 333 and a paper jam has occurred. Thus the secondary controller 200 notifies the primary controller 201 of occurrence of the paper jam (S711).

Like in the above case (S706: YES), upon being notified of the occurrence of the paper jam, the primary controller 201 displays the notification on the operation panel 202 to the user of the image forming apparatus 100. The secondary controller 200 may further notify the diagnostic server 101 of the occurrence of the paper jam.

In the case where the timing sensor 333 senses the leading edge of the recording sheet (S709: YES) before the period (T2−T1) elapsed from the sensing time of the leading edge of recording sheet by the feed sensor 331a exceeds the threshold value #2 (S708: NO), the secondary controller 200 calculates a sheet arrival period T by subtracting the time T1 from the current time T2, at which the leading edge of the recording sheet has been sensed by the timing sensor 333. The secondary controller 200 sends the calculated sheet arrival period T to the diagnostic server 101 (S710).

Then, the flow returns to Step S701 to repeat the above processing.

Note that the sheet arrival period T increases due to sliding between recording sheets and at least one of the pickup roller 301a, the feed roller 302a, and the separation roller 303a, which is caused for example by deterioration of these rollers or adhesion of paper dust to these rollers. To suppress the communication load between the secondary controller 200 and the primary controller 201 during notification of the sheet arrival period T to the diagnostic server 101, a conventional method has been used according to which a mean value is calculated for 50 calculations of the sheet arrival period T, and the calculated mean value is sent to the diagnostic server 101.

Accordingly, in the case where a sliding does not often occur between the rollers and recording sheets, an increase of the sheet arrival period T due to such a sliding does not largely vary the mean value of sheet arrival periods T. Thus the diagnostic server 101 cannot detect for example deterioration of the rollers.

Also, as well as in the case of the mean value for 50 calculations, it is true that the communication load is suppressed, by calculating the maximum value for 50 calculations of the sheet arrival period T and sending the calculated maximum value to the diagnostic server 101. However, if a sliding occurs in the first calculation of 50 calculations, the diagnostic server 101 can sense deterioration of the rollers only later.

Furthermore, in the case where a frequency of replacing deteriorated rollers is optimized based on an occurrence frequency of recording sheet sliding which has reached a certain frequency, it is impossible to acquire the occurrence frequency of recording sheet sliding by notifying of only the maximum value. Thus, notification of only the maximum value is inappropriate.

According to one or more embodiments, meanwhile, the secondary controller 200 directly notifies the diagnostic server 101 of the sheet arrival period T without relaying via the primary controller 201. Thus, the sheet arrival period T is sent for each calculation without increasing the communication load between the secondary controller 200 and the primary controller 201.

Thus, by notifying the diagnostic server 101 of the sheet arrival period T for each image forming apparatus 100, it is possible to avoid the failure to find the maximum value of the sheet arrival period T hidden by normal sheet arrival periods T due to an excessive equalization and also avoid the failure to acquire an occurrence time or occurrence frequency of a recording sheet sliding due to notification of only the maximum value. This enables the diagnostic server 101 to promptly and reliably sense and handle occurrence of such a recording sheet sliding.

With respect to an image forming apparatus #1 in a table shown in FIG. 8 for example, a sheet arrival period T received on May 10, 2018, at 10:00:03 indicates 270 milliseconds, and sheet arrival periods T received on other dates and times indicate almost 250 milliseconds. For example, in the case where the sheet arrival period T of 270 milliseconds is received only once and the sheet arrival period T of 250 milliseconds is received 49 times among 50 times for example, a mean value for the 50 times is calculated as follows: (270+250×49)/50=250.4 milliseconds.

Here, a threshold value of the sheet arrival period T for sensing occurrence of a recording sheet sliding is set to 260 milliseconds. The calculated mean value, 250.4 milliseconds, is less than the threshold value, and thus the diagnostic server 101 cannot sense occurrence of a recording sheet sliding. According to one or more embodiments, meanwhile, the mean value of the sheet arrival periods T is not calculated but the diagnostic server 101 is notified of all the sheet arrival periods T. The sheet arrival period T of 270 milliseconds received on May 10, 2018, at 10:00:03 is larger than the threshold value, and thus the diagnostic server 101 can sense occurrence of a recording sheet sliding.

Also, for example in accordance with a timing when the sheet arrival period T of 270 milliseconds, which exceeds the threshold value, is received on May 10, 2018, at 10:00:03, the diagnostic server 101 may cause the image forming apparatus 100 to stop image forming processing. This prevents occurrence of a paper jam due to a recording sheet sliding in subsequent image forming processing. According to the conventional method as above, the maximum value is calculated for example for 50 calculations of the sheet arrival period T and then the diagnostic server 101 is notified of the determined maximum value. Such a method cannot reliably prevent occurrence of a paper jam due to a recording sheet sliding.

According to one or more embodiments, furthermore, the secondary controller 200 directly notifies the diagnostic server 101 of the sheet arrival period T without relaying via the primary controller 201. This suppresses the communication load between the secondary controller 200 and the primary controller 201 to achieve smooth execution of image forming processing.

Note that the secondary controller 200 and the primary controller 201 may use a shared memory to perform communication for image forming processing, instead of using the UARTs.

Also, the secondary controller 200 and the diagnostic server 101 may use a long term evolution (LTE) line for communication instead of using the LAN interfaces.

Furthermore, the secondary controller 200 may collectively send multiple values of the sheet arrival period T for multiple times within an allowable precision range of failure diagnostics and lifespan diagnostics by the diagnostic server 101. In the case where the secondary controller 200 cannot notify the diagnostic server 101 of the sheet arrival period T due to any failure or maintenance of the diagnostic server 101, the secondary controller 200 may hold therein the sheet arrival periods T and collectively notify the diagnostic server 101 of the sheet arrival periods T held therein after communication with the diagnostic server 101 becomes available.

(1-6) Other Examples of Diagnostic Data

The following describes other examples of diagnostic data.

(1-6-1) Accumulated Number of Rotations of Photosensitive Drum 331

The secondary controller 200 may send an accumulated number of rotations of a photosensitive drum 331 as diagnostic data to the diagnostic server 101.

The photosensitive drum 331 includes a photosensitive layer which forms electrostatic latent images by charging and exposure and a protective layer which covers the photosensitive layer. When the protective layer becomes abraded, the photosensitive layer, which is provided under the protective layer, accordingly becomes abraded. This might cause unevenness in charging, exposure, and developing to result in quality deterioration of toner images.

The abrasion state of the protective layer and the photosensitive layer correlate with the accumulated number of rotations of the photosensitive drum 331. Thus, the secondary controller 200 may send the accumulated number of rotations of the photosensitive drum 331 as diagnostic data to the diagnostic server 101, such that diagnostic server 101 estimates the abrasion state of the photosensitive drum 331 based on the accumulated number of rotations thus received, thereby to perform lifespan diagnostics of the photosensitive drum 331.

Figure 5:
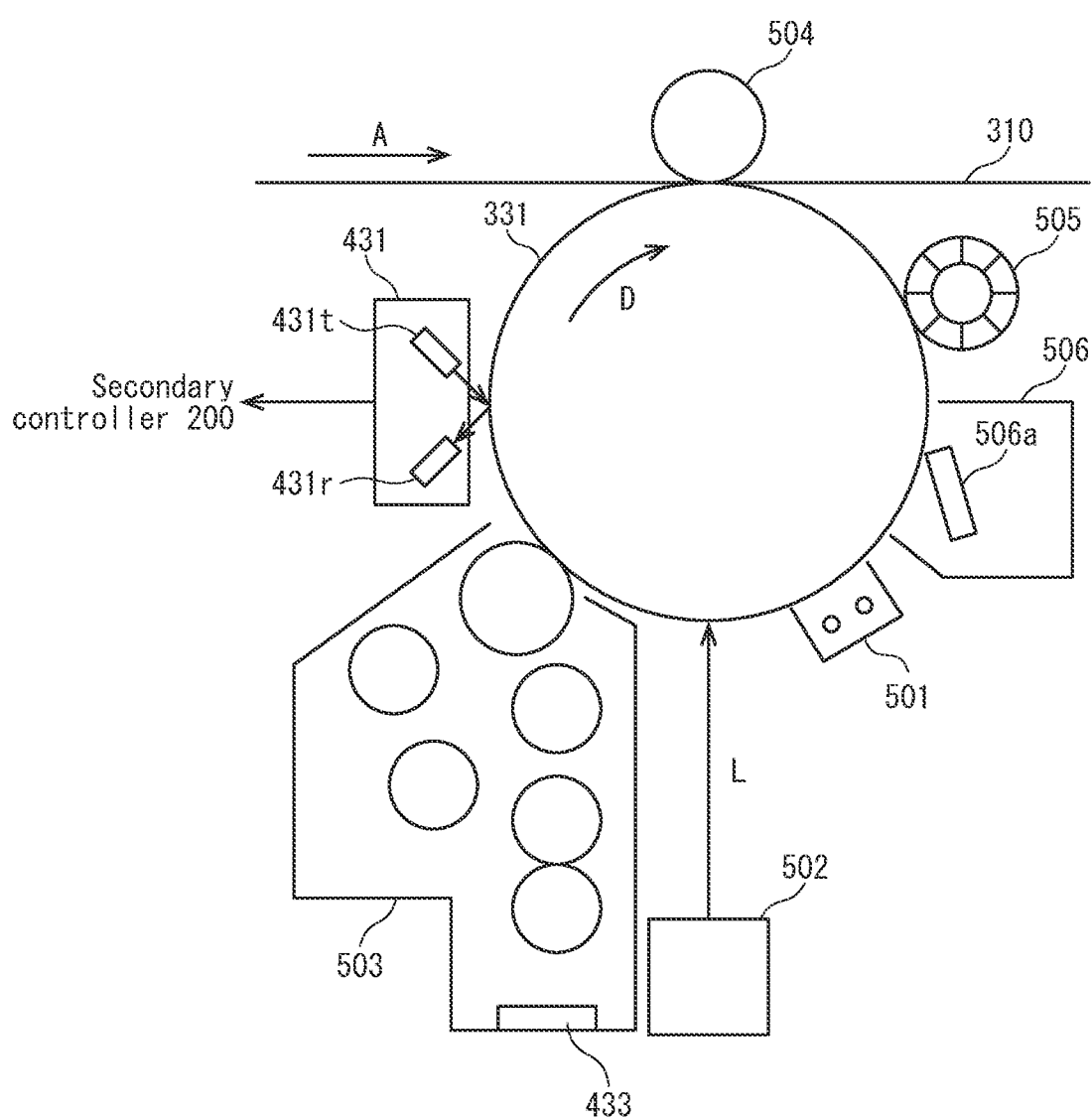
FIG. 5 shows the configuration of a surface state sensor 431 in an image forming unit 311 according to one or more embodiments.

FIG. 5 shows the main components of an image forming unit 311 of the image forming apparatus 100. In the figure, the photosensitive drums 331Y, 331M, 331C, and 331K in FIG. 3 are collectively represented as the photosensitive drum 331.

The following describes image formation by the image forming apparatus 100. As shown in FIG. 5, while the photosensitive drum 331 is driven to rotate in a direction indicated by an arrow D, a charger 501 uniformly charges the outer circumferential surface of the photosensitive drum 331. An exposure unit 502 irradiates the outer circumferential surface of the photosensitive drum 331 with laser beam L modulated according to image data to form an electrostatic latent image. A developing unit 503 supplies toner of the relevant color to develop the electrostatic latent image to form a toner image. A primary transfer roller 504 performs an electrostatic transfer (primary transfer) of the toner image onto the outer circumferential surface of an intermediate transfer belt 310.

The secondary controller 200 counts the accumulated number of rotations of each of the photosensitive drums 331 of the Y, M, C, and K colors. Each time the number of rotations reaches a predefined value, the secondary controller 200 sends the accumulated number of rotations of the photosensitive drum 331 as diagnostic data to the diagnostic server 101.

The secondary controller 200 sends the accumulated number of rotations of each of the photosensitive drums 331 of the Y, M, C, and K colors to the diagnostic server 101 by the LAN interface 400 without relaying via the primary controller 201. This configuration increases a frequency of sending the accumulated number of rotations without increasing a communication amount between the secondary controller 200 and the primary controller 201, thereby improving the precision of failure diagnostics and lifespan diagnostics performed by the diagnostic server 101.

Note that an amount of toner deposited on the outer circumferential surface of the photosensitive drum 331 may be sensed by a surface state sensor 431 which is described later. Specifically, a predefined toner patch is formed on the outer circumferential surface of the photosensitive drum 331, and an amount of specular light from the toner patch is sensed. The amount of toner deposited on the outer circumferential surface of the photosensitive drum 331 can vary depending on the state of the outer circumferential surface of the photosensitive drum 331. Thus, the secondary controller 200 may send the amount of specular light from the toner patch as diagnostic data to the diagnostic server 101, such that the diagnostic server 101 performs lifespan diagnostics of the photosensitive drum 331 as well as in the above case of the accumulated number of rotations.

(1-6-2) Voltage Supplied to Fixing Heater

The secondary controller 200 may send a voltage value supplied to a fixing heater as diagnostic data to the diagnostic server 101.

The image forming apparatus 100 supplies a fixing heater (not illustrated) for heating a fixing roller 312 with a high-voltage power which varies depending on deterioration of the fixing heater over time. Thus, the secondary controller 200 may send the voltage value supplied to the fixing heater as diagnostic data to the diagnostic server 101, such that the diagnostic server 101 performs failure diagnostics and lifespan diagnostics of the fixing heater.

(1-6-3) Rotation Amount of Cartridge Motor

The secondary controller 200 may send a rotation amount of a cartridge motor as diagnostic data to the diagnostic server 101.

Figure 6:
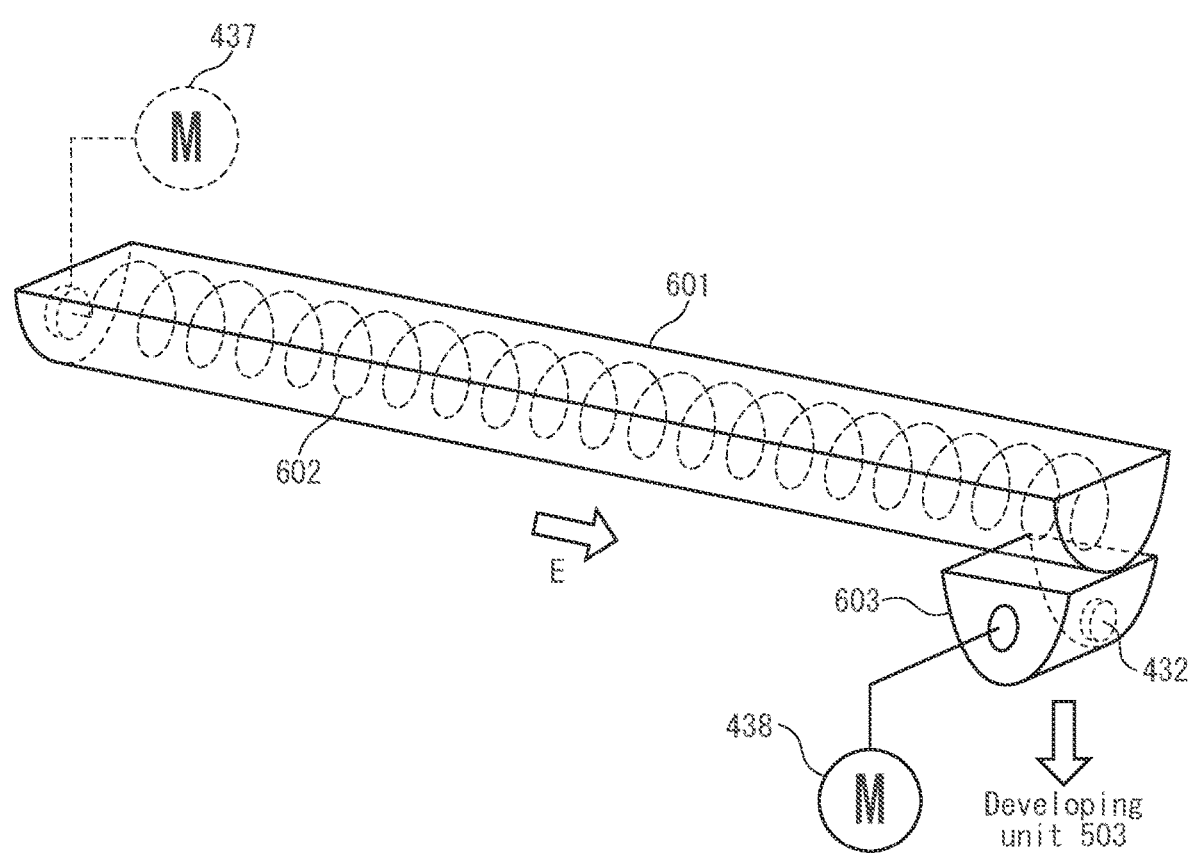
FIG. 6 shows the configuration of a toner cartridge 601 and a sub hopper 603 according to one or more embodiments.

As shown in FIG. 6, a cartridge motor 437 is driven to rotate a spiral spring 602, such that developer contained in a toner cartridge 601 is conveyed in a direction indicated by an arrow E and drops in a sub hopper 603. The cartridge motor 437 is for example a stepping motor, and controls a rotation amount of the spiral spring 602 to adjust an amount of developer dropping in the sub hopper 603. A sub hopper motor 438 rotates a paddle which is not illustrated, such that the developer dropped in the sub hopper 603 is conveyed to the developing unit 503. The sub hopper 603 includes therein a piezoelectric sensor 432 which senses the amount of developer in the sub hopper 603.

With reference to an output signal of a toner cartridge door cover sensor 435, the secondary controller 200 senses that the toner cartridge door cover 222 has been opened and closed. Then, with reference to an output signal of a toner cartridge set sensor 434, the secondary controller 200 senses that the toner cartridge 601 has been mounted, and thus drives the cartridge motor 437 to start supplying developer.

In the case where the front cover 223 is opened and closed for accessing the toner cartridge 601, the secondary controller 200 refers to an output signal of a front cover sensor 436 which senses the open and closed state of the front cover 223 so as to perform the similar processing.

Also, the developing unit 503 houses therein developer, and includes therein a toner/carrier ratio (TCR) sensor 433 for sensing a density of toner in the developer. The TCR sensor 433 may for example be a magnetic permeability sensor. In other words, focusing on the difference in magnetic permeability between toner and carrier which compose developer, it is possible to sense the toner density by sensing the magnetic permeability of the developer.

In addition, upon sensing that the toner density in the developing unit 503 with reference to an output signal of the TCR sensor 433, the secondary controller 200 also drives the cartridge motor 437 to supply developer from the toner cartridge 601 to the developing unit 503.

Thus, the secondary controller 200 may send the rotation amount of the cartridge motor 327 as diagnostic data to the diagnostic server 101, such that the diagnostic server 101 senses an amount of toner remaining in the toner cartridge 601 with use of the diagnostic data thereby to perform lifespan diagnostics of the toner cartridge 601.

(1-6-4) Surface State of Photosensitive Drum 331

The secondary controller 200 may send the surface state of the photosensitive drum 331 as diagnostic data to the diagnostic server 101, such that the diagnostic server 101 performs lifespan diagnostics of a lubricant supply member 505 which supplies lubricant to the surface of the photosensitive drum 331.

A cleaning unit 506 shown in FIG. 5 cleans off residual toner on the outer circumferential surface of the photosensitive drum 331 after a primary transfer. Specifically, a cleaning blade 506a included in the cleaning unit 506 scrapes the residual toner. During this cleaning, if an excessive friction is generated between the photosensitive drum 331 and the cleaning blade 506a, a burr occurs in the cleaning blade 506a and thus scraping residual toner becomes difficult.

To reduce the friction, the lubricant supply member 505 is used to apply a lubricant to the photosensitive drum 331. However, an application amount of the lubricant decreases due to abrasion of the lubricant supply member 505 which deteriorates over time. This might insufficiently reduce the friction between the photosensitive drum 331 and the cleaning blade 506a.

The surface state sensor 431 is a surface state sensor of a specular reflection type which faces the outer circumferential surface of the photosensitive drum 331, between the developing unit 503 and the primary transfer roller 504 in a rotational direction of the photosensitive drum 331. The surface state sensor 431 includes light-emitting elements 431t which are light-emitting diodes (LEDs) and photoreceptors 431r which are phototransistors. The light-emitting elements 431t irradiate the outer circumferential surface of the photosensitive drum 331 with light at an angle of incidence of 45 degrees. Meanwhile, the photoreceptors 431r receive specular light from the photosensitive drum 331, namely, reflected light at an angle of reflection of 45 degrees.

The surface of the photosensitive drum 331 on which an appropriate amount of lubricant is applied is opaque and reflects light diffusely. As the lubricant amount on the surface of the photosensitive drum 331 decreases, the surface of the photosensitive drum 331 becomes more specular and thus emits reflected light containing more components of specular light.

Thus, an amount of specular light received by the photoreceptors 431r varies in proportion to the amount of lubricant on the outer circumferential surface of the photosensitive drum 331. An output signal of the surface state sensor 431, specifically, an output signal of the photoreceptors 431r, is inputted to the secondary controller 200. With reference to the output signal of the surface state sensor 431, the secondary controller 200 generates diagnostic data and sends the diagnostic data to the diagnostic server 101. Thus, the diagnostic server 101 refers to the diagnostic data to perform lifespan diagnostics of the lubricant supply member 505.

(1-6-5) Other Examples of Sheet Arrival Period T

The following describes other examples of the sheet arrival period T.

Image forming processing is performed for example on recording sheets housed in a 2nd-level feed tray as follows. A 2nd-level pickup roller 301b picks up the top one of the recording sheets housed in the 2nd-level feed tray, and a 2nd-level feed roller 302b feeds the top recording sheet onto the conveyance path while a 2nd-level separation roller 303b prevents overlapping of a recording sheet below the top recording sheet.

Upon sensing the leading edge of the recording sheet fed by the 2nd-level feed roller 302*b*, a 2nd-level feed sensor 331*b* switches an output signal from ON to OFF. The secondary controller 200 thus senses a time T1*b* at which the 2nd-level feed sensor 331*b* has sensed the recording sheet.

Then, the recording sheet is guided to a sensing position of a 2nd-level vertical conveyance sensor 332 by the conveyance guide, which is not illustrated. Upon sensing the leading edge of the recording sheet, the 2nd-level vertical conveyance sensor 332 switches an output signal from ON to OFF. The secondary controller 200 thus senses a time T2*b* at which the 2nd-level vertical conveyance sensor 332 has sensed the recording sheet, calculates a 2nd-level sheet arrival period T from the time T1*b* to the time T2*b*, and sends the calculated value as sensor data to the diagnostic server 101.

The 1st-level pickup roller 301*a*, the 1st-level feed roller 302*a*, and the 1st-level separation roller 303*a* are driven by the 1st-level feed motor 321*a* to rotate. The 2nd-level pickup roller 301*b*, the 2nd-level feed roller 302*b*, and the 2nd-level separation roller 303*b* are driven by the 2nd-level feed motor 321*b* to rotate. The 1st-level feed motor 321*a* and the 2nd-level feed motor 321*b* are driven and controlled by the secondary controller 200.

In the image forming apparatus 100, recording sheets may be supplied from a manual feed tray, in addition to the 1st-level feed tray and the 2nd-level feed tray. A multi manual feed roller 305 is driven by a multi manual feed motor 323 to rotate so as to feed the recording sheets housed in the manual feed tray piece by piece from the top recording sheet.

The recording sheets thus fed are conveyed as follows for image formation.

Until the recording sheet arrives at a pair of timing rollers 306, a timing motor 324 has stopped rotating the timing rollers 306. After an elapse of a predefined period since the timing sensor 333 has sensed the leading edge of the recording sheet, the timing motor 324 starts rotating the timing rollers 306. This configuration enables conveyance of the recording sheet whose leading edge is in abutment with a conveyance nip formed between the timing rollers 306, which has been stopped rotating. Thus, a loop is formed such that skew of the recording sheet is corrected. Also, such a control of the rotation start timing of the timing rollers 306 enables transfer of a toner image onto an appropriate position on the recording sheet.

The image forming units 311Y, 311M, 311C, and 311K respectively include the photosensitive drums 331Y, 331M, 331C, and 331K for respective Y, M, C, and K color toner image formation. The image forming units 311Y, 311M, 311C, and 311K sequentially form respective toner images of the Y, M, C, and K colors on the outer circumferential surfaces of the photosensitive drums 331Y, 331M, 331C, and 331K with use of the chargers 501, the exposure units 502, and the developing units 503 included therein.

The Y, M, C, and K color toner images on the outer circumferential surfaces of the photosensitive drums 331Y, 331M, 331C, and 331K are electrostatically transferred onto the outer circumferential surface of the intermediate transfer belt 310 by the primary transfer roller 504, such that the toner images overlap one another to be a color toner image. The intermediate transfer belt 310 is tensioned by a driving roller 308 and a driven roller 309. A main motor 325 drives the driving roller 308 to rotate and accordingly the intermediate transfer belt 310 rotates in a direction indicated by an arrow A in FIG. 3.

A secondary transfer roller 307 is brought into pressure-contact with the driving roller 308 across the intermediate transfer belt 310 so as to form a secondary transfer nip therebetween. The timing rollers 306 convey the recording sheet to the secondary transfer nip in accordance with a conveyance timing of the color toner image by the intermediate transfer belt 310. At the secondary transfer nip, the color toner image is electrostatically transferred onto the recording sheet.

Then, the fixing roller 312 thermally fixes the color toner image onto the recording sheet, and a pre-eject roller 313 conveys the recording sheet further. An eject sensor 334 is provided downstream of the pre-eject roller 313 in a conveyance direction and senses the leading edge of the recording sheet. In accordance with a sensing timing of the leading edge of the recording sheet by the eject sensor 334, a path switch solenoid 337 switches an orientation of a switching gate 314.

The conveyance path of the recording sheet is thus switched between an eject path 341 and a reverse path 342. In particular, to perform duplex printing on consecutive recording sheets, the orientation of the switching gate 314 is switched to cause the eject sensor 334 to sense the leading edge of a recording sheet. With this structure, it is possible to alternately perform guidance of a recording sheet after printing on only one side to the reverse path 342 and guidance of a recording sheet after printing on both sides to the eject path 341.

In the case where the recording sheet is guided to the eject path 341, an eject motor 327 drives an eject roller 315 to rotate, such that the recording sheet is ejected outside the image forming apparatus 100. Meanwhile, in the case where the recording sheet is guided to the reverse path 342, a reverse motor 328 drives a reverse roller 316 to rotate in a direction indicated by an arrow B in FIG. 3, such that the recording sheet further advances on the reverse path 342. Then, the reverse motor 328 rotates in reverse and thus drives the reverse roller 316 to rotate in a direction indicated by an arrow C in the figure, such that the recording sheet is conveyed toward an automatic duplex unit (ADU) conveyance roller 317.

The recording sheet is conveyed on the reverse path 342 by ADU conveyance rollers 317, 318, 319, and 320 until the leading edge of the recording sheet arrives at the timing rollers 306.

The ADU conveyance rollers 317 and 318 are driven by an ADU conveyance motor 329 to rotate. The ADU conveyance rollers 319 and 320 are driven by an ADU conveyance motor 330 to rotate. Also, the secondary controller 200 monitors times at which ADU conveyance sensors 335 and 336 sense the leading edge of the recording sheet, thereby to sense a paper jam which has occurred on the reverse path 342.

While the recording sheet passes through the secondary transfer nip via the reverse path 342, a color toner image is transferred onto a reverse side of the recording sheet. The color toner image is thermally fixed onto the reverse side of the recording sheet by the fixing roller 312, and then the recording sheet is guided by the switching gate 314 to the eject path 341 for ejection outside the image forming apparatus 100.

In the image forming apparatus 100 with this configuration, the secondary controller 200 refers to output signals of sheet sensors including the 1st-level feed sensor 331*a*, the 2nd-level feed sensor 331*b*, the 2nd-level vertical conveyance sensor 332, the timing sensor 333, the eject sensor 334, and the ADU conveyance sensors 335 and 336, so as to sense times at which the leading edge or the trailing edge of the recording sheet has arrived at respective sensing positions of the sheet sensors.

This sensing enables the secondary controller 200 to drive and control the drive motors including the 1st-level feed motor 321a, the 2nd-level feed motor 321b, a 2nd-level vertical conveyance motor 322, the multi manual feed motor 323, the timing motor 324, the main motor 325, the fixing motor 326, the eject motor 327, the reverse motor 328, the ADU conveyance motors 329 and 330 and the path switch solenoid 337.

Also, the secondary controller 200 senses occurrence of a paper jam based on delay of the arrival time of the recording sheet.

Furthermore, the secondary controller 200 calculates the sheet arrival period T, which indicates the arrival time of the recording sheet, and sends the sheet arrival period T to the diagnostic server 101. With reference to the received sheet arrival period T, the diagnostic server 101 estimates a deterioration state for example indicating abrasion or dust such as paper dust adhesion to perform failure diagnostics and lifespan diagnostics with respect to the rollers including the timing rollers 306, the secondary transfer roller 307, the fixing roller 312, the pre-eject roller 313, the eject roller 315, the reverse roller 316, and the ADU conveyance rollers 317-320.

(1-6-6) Torque Values of Conveyance Motors

The secondary controller 200 may calculate torque values of the conveyance motors with reference to drive currents thereof and send the calculated torque values as diagnostic data to the diagnostic server 101.

The torques of the conveyance motors vary depending on the abrasion state of the conveyance rollers including the 1st-level pickup roller 301a, the 1st-level feed roller 302a, the 1st-level separation roller 303a, the 2nd-level pickup roller 301b, the 2nd-level feed roller 302b, the 2nd-level separation roller 303b, a 2nd-level conveyance roller 304, the multi manual feed roller 305, the timing rollers 306, the secondary transfer roller 307, the fixing roller 312, the pre-eject roller 313, the eject roller 315, the reverse roller 316, and the ADU conveyance rollers 317-320.

Thus, the secondary controller 200 sends the torque values of the conveyance motors as diagnostic data to the diagnostic server 101, such that the diagnostic server 101 performs lifespan diagnostics of the conveyance rollers.

[2] Second Embodiment

In an image forming apparatus diagnostic system 1 according to one or more embodiments, a secondary controller 200 sends diagnostic data to a diagnostic server 101 via a PC 102.

Figure 9:
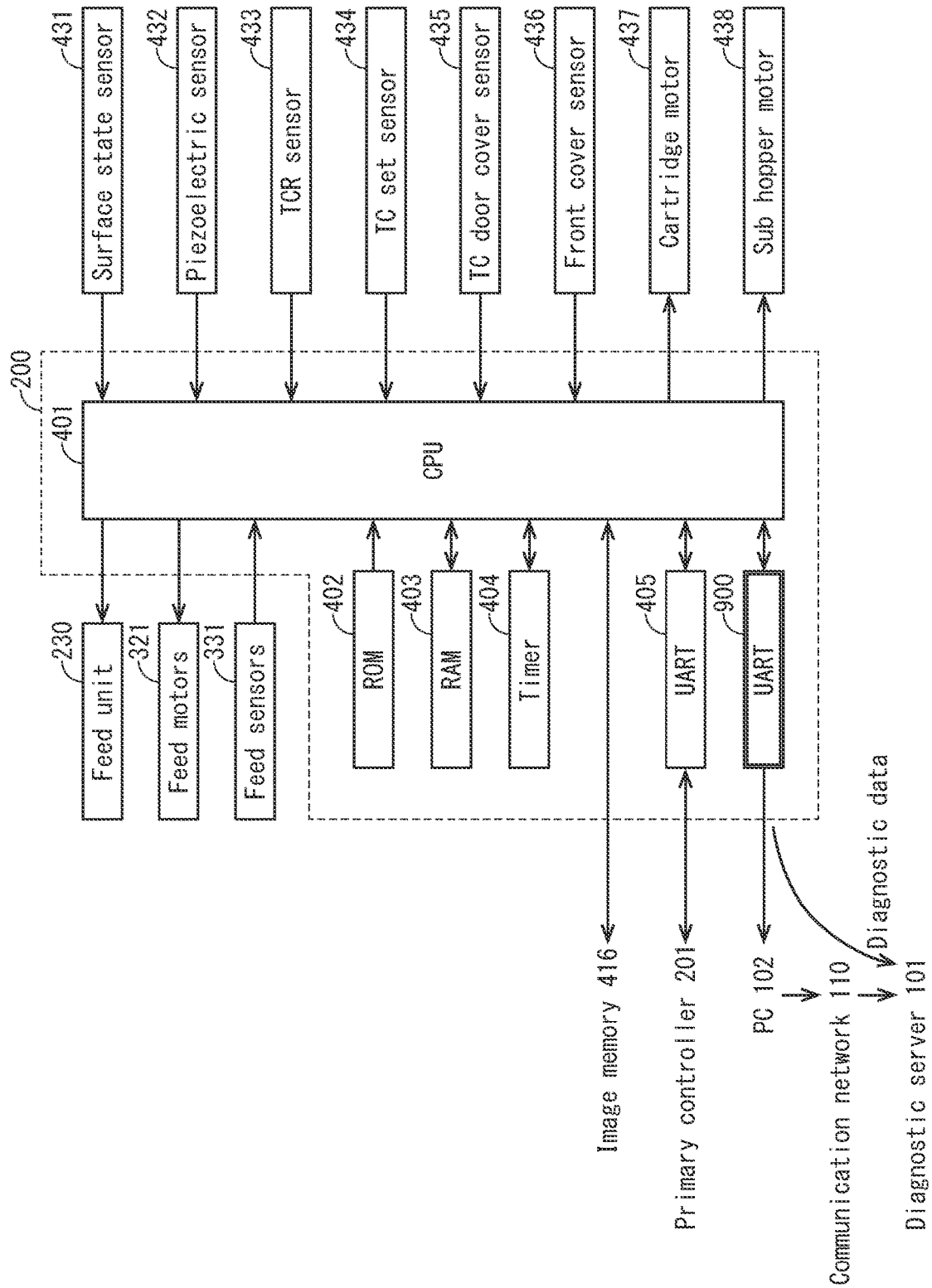
FIG. 9 is a block diagram showing main components of a secondary controller 200 according to a second embodiment.

As shown in FIG. 9, the secondary controller 200 according to one or more embodiments includes a UART 900 instead of the LAN interface 400 shown in FIG. 4, and is connected to the PC 102 by the UART 900 so as to communicate with the PC 102. The PC 102 is connected to the diagnostic server 101 via the communication network 110 so as to perform duplex communication with the diagnostic server 101.

The secondary controller 200 sends sensor data, which has for example been acquired with reference to the sensor, as diagnostic data to the PC 102 by the UART 900. The PC 102 sends the diagnostic data thus received to the diagnostic server 101 via the communication network 110.

Even with this configuration, the secondary controller 200 sends diagnostic data to the diagnostic server 101 without relaying via the primary controller 201, as in the above first embodiment.

[3] Third Embodiment

In an image forming apparatus diagnostic system 1 according to one or more embodiments, a secondary controller 200 sends diagnostic data to a diagnostic server 101 via wireless communication.

Figure 10:
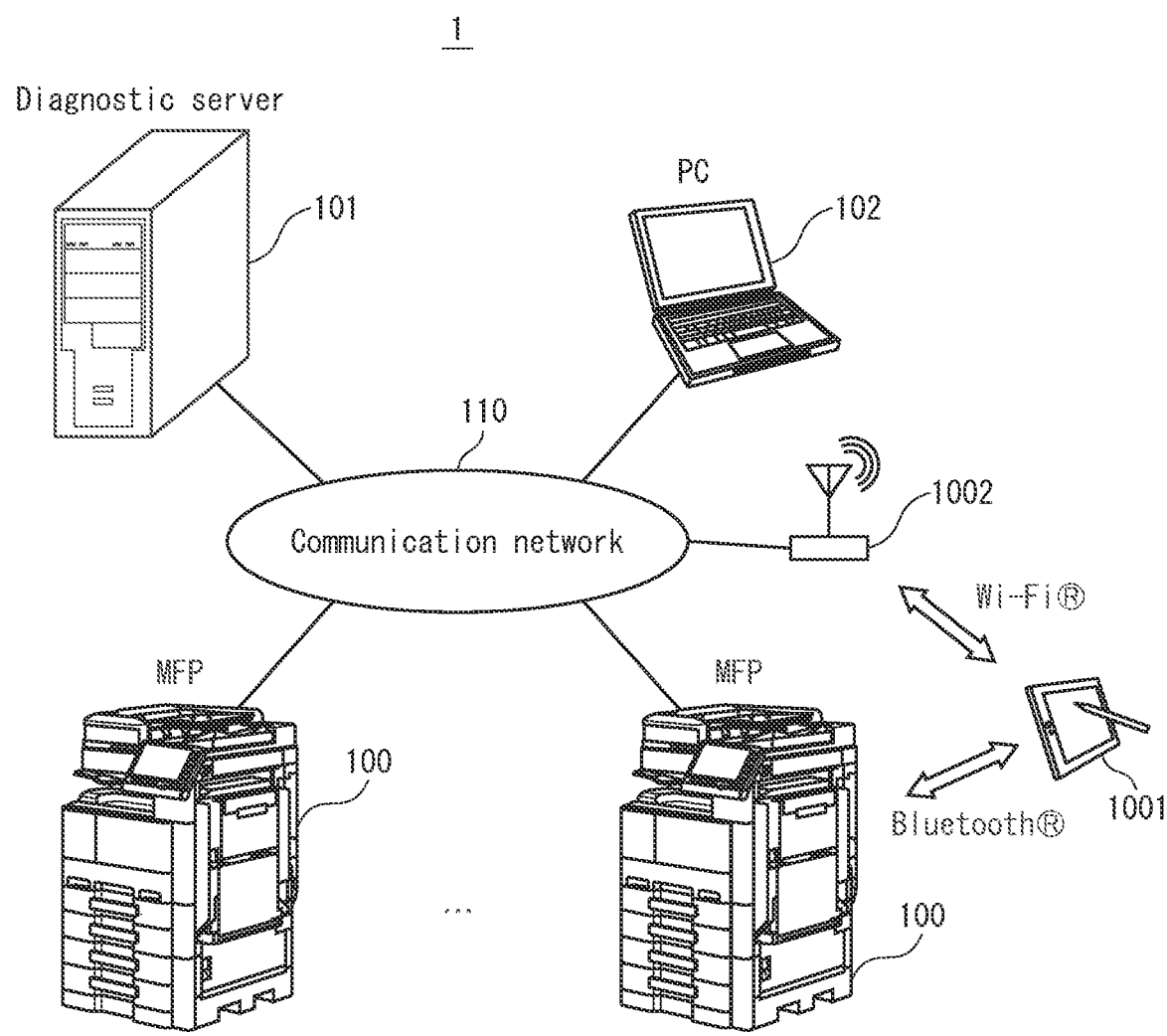
FIG. 10 shows main components of an image forming apparatus diagnostic system 1 according to a third embodiment.

As shown in FIG. 10, the image forming apparatus diagnostic system 1 according to one or more embodiments includes a tablet terminal 1001 and a wireless LAN router 1002, in addition to the elements of the image forming apparatus diagnostic system 1 according to the above first embodiment. The tablet terminal 1001 performs wireless communication with the image forming apparatus 100 by the Bluetooth® standard and wireless communication with the wireless LAN router 1002 by the Wi-Fi® standard, so as to perform duplex communication with the diagnostic server 101 via the communication network 110.

Figure 11:
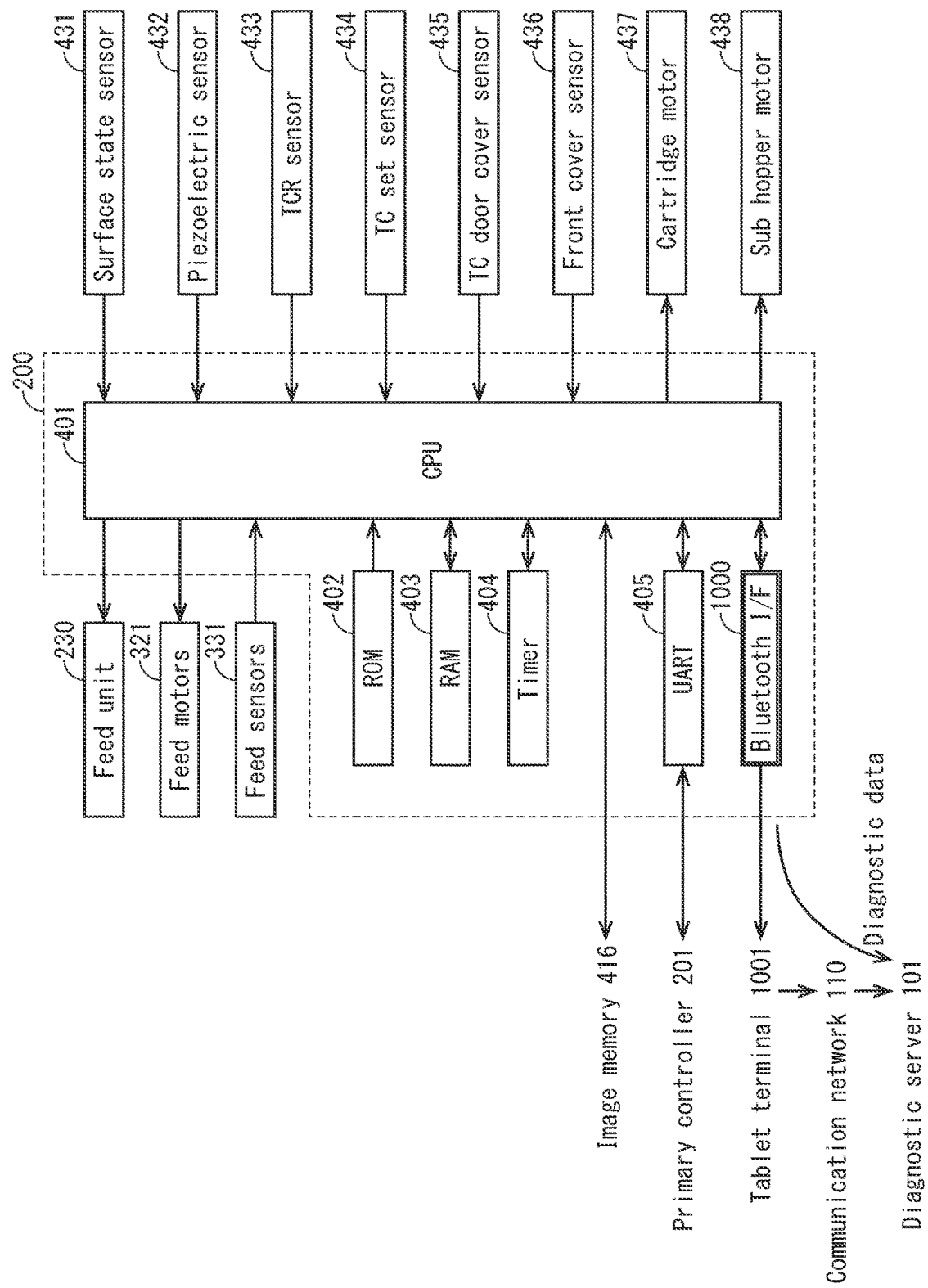
FIG. 11 is a block diagram showing main components of a secondary controller 200 according to the third embodiment.

As shown in FIG. 11, the secondary controller 200 according to one or more embodiments includes a Bluetooth® interface 1100 instead of the LAN interface 400 shown in FIG. 4. The secondary controller 200 is connected to the tablet terminal 1001 by the Bluetooth® interface 1100 so as to communicate with the tablet terminal 1001.

The secondary controller 200 sends diagnostic data to the tablet terminal 1001 by the Bluetooth® interface 1100. The tablet terminal 1001 sends the diagnostic data thus received to the diagnostic server 101.

Even with this configuration, the secondary controller 200 sends diagnostic data to the diagnostic server 101 without relaying via the primary controller 201, as in the above first embodiment. It is thus possible to send a large amount of diagnostic data to the diagnostic server 101 at a high frequency, without hindering an image forming processing instruction from being sent from the primary controller 201 to the secondary controller 200. This improves the precision of failure diagnostics and lifespan diagnostics.

Note that the tablet terminal 1001 may be used as an operation panel of the image forming apparatus 100, instead of the operation panel 202 shown in FIG. 2.

[4] Fourth Embodiment

In an image forming apparatus diagnostic system 1 according to one or more embodiments, an image forming apparatus 100 is disposed inside an office for example and is connected to a LAN, and a secondary controller 200 of the image forming apparatus 100 sends diagnostic data to a diagnostic server 101 which is disposed outside the office and is connected to an Internet.

Figure 12:
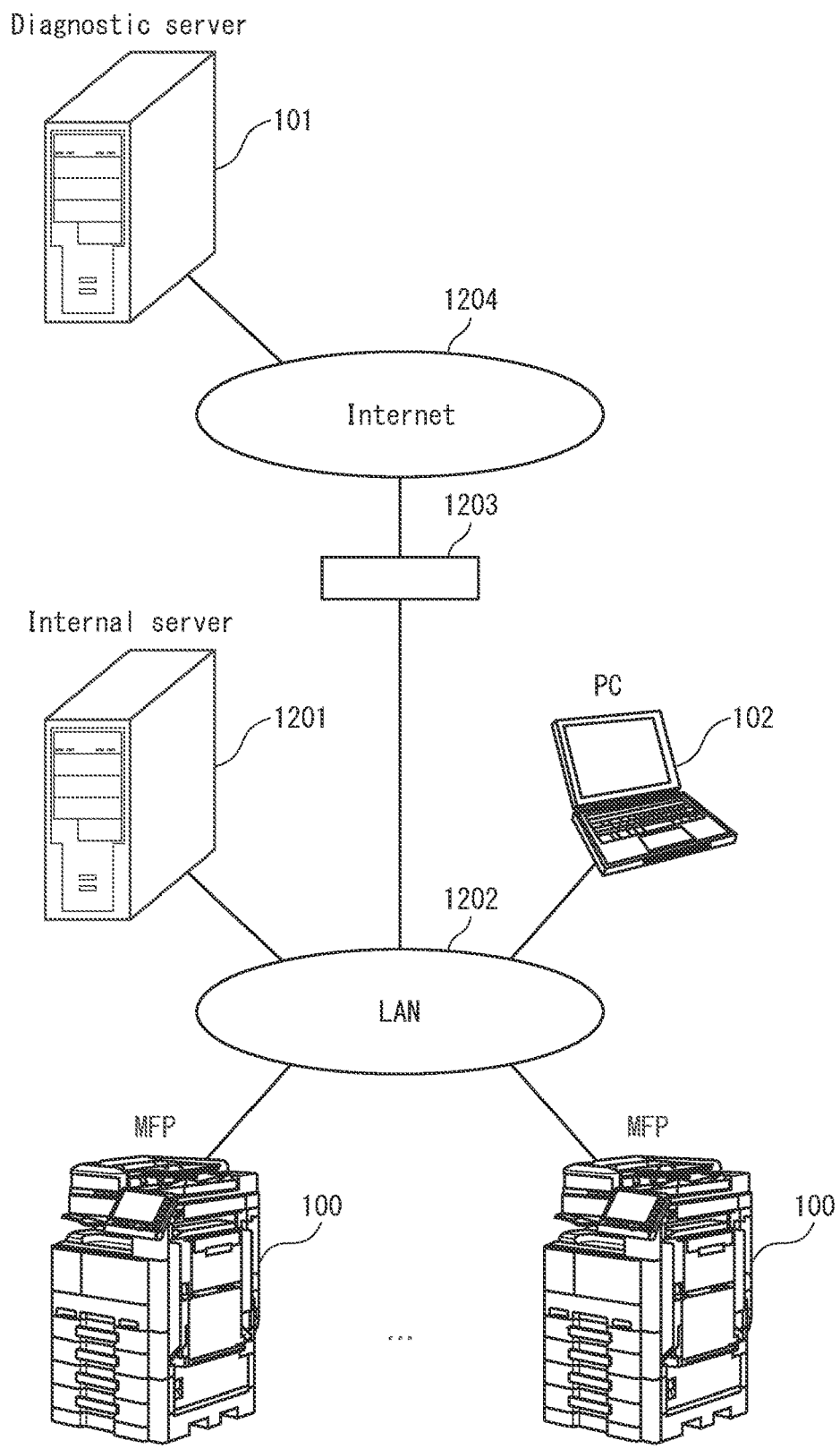
FIG. 12 shows main components of an image forming apparatus diagnostic system 1 according to a fourth embodiment.

As shown in FIG. 12, in the image forming apparatus diagnostic system 1 according to one or more embodiments, the image forming apparatus 100, a PC 102, and an internal server 1201 are connected to a LAN 1202. The LAN 1202 is connected to an Internet 1204 via a router 1203. Among the apparatuses which are connected to the LAN 1202, only the internal server 1201 is permitted to connect to the Internet 1204. Other apparatuses, namely, the image forming apparatus 100 and the PC 102, can connect to the Internet 1204 only via the internal server 1201.

The diagnostic server 101 is connected to the Internet 1204. Note that the diagnostic server 101 may be a so-called cloud server.

Figure 13:
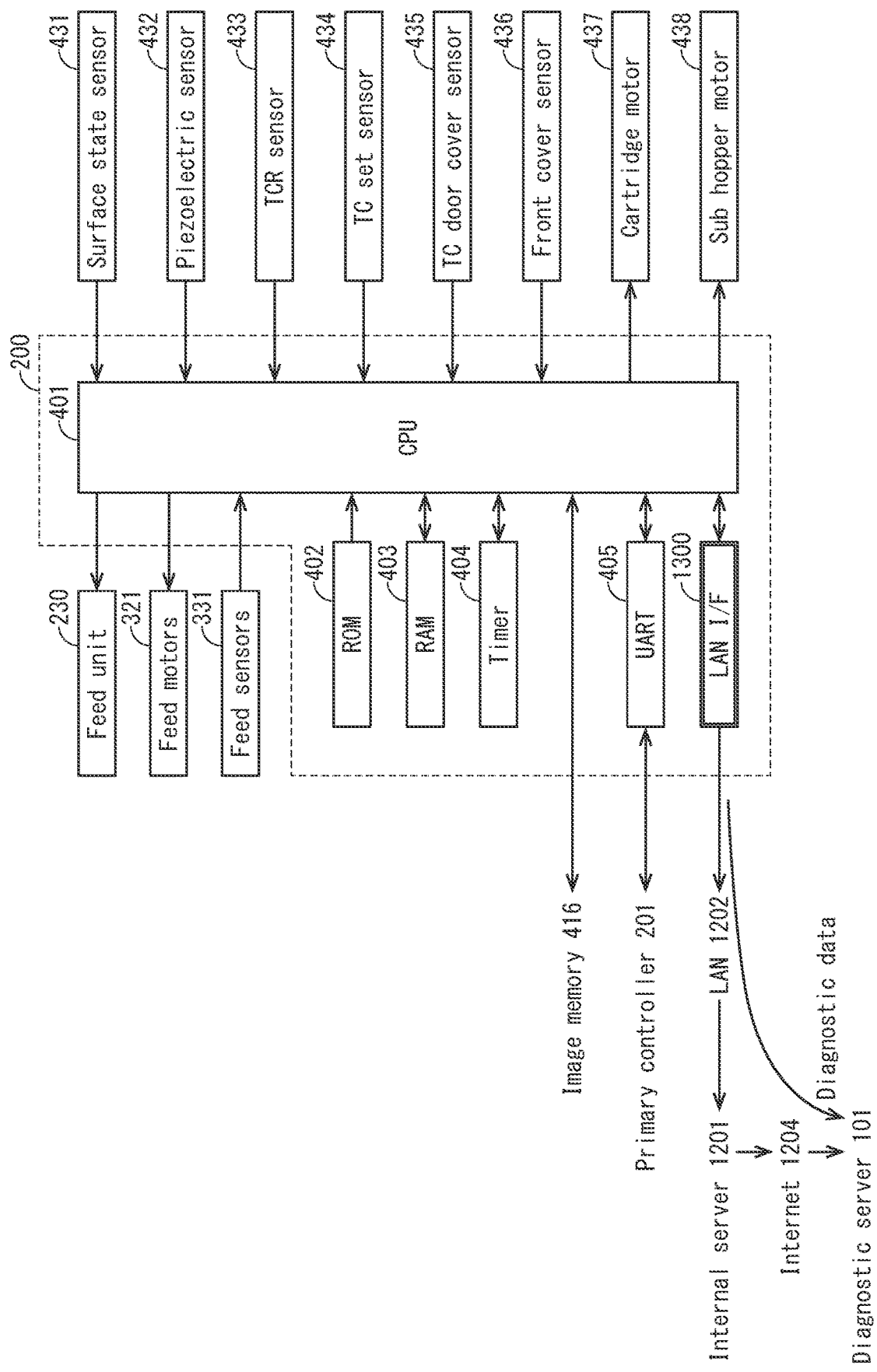
FIG. 13 is a block diagram showing main components of a secondary controller 200 according to the fourth embodiment.

As shown in FIG. 13, the secondary controller 200 includes a LAN interface 1300, and may send diagnostic data as follows. The secondary controller 200 sends diagnostic data to the internal server 1201 by the LAN interface 1300 via the LAN 1202. The internal server 1201 sends the diagnostic data thus received to the diagnostic server 101 via the Internet 1204.

Even with this configuration, it is possible to improve the precision of failure diagnostics and lifespan diagnostics performed by the diagnostic server 101, without increasing the communication load between the secondary controller 200 and the primary controller 201.

[5] Fifth Embodiment

In an image forming apparatus diagnostic system 1 according to one or more embodiments, a LAN interface 400 is an optional component which is optionally mounted in a secondary controller 200 of an image forming apparatus 100. Only in the case where the LAN interface 400 is mounted in the secondary controller 200 and a user of the image forming apparatus 100 has a contract of using a diagnostics service performed by the diagnostic server 101, the secondary controller 200 sends diagnostic data to the diagnostic server 101.

Figure 14:
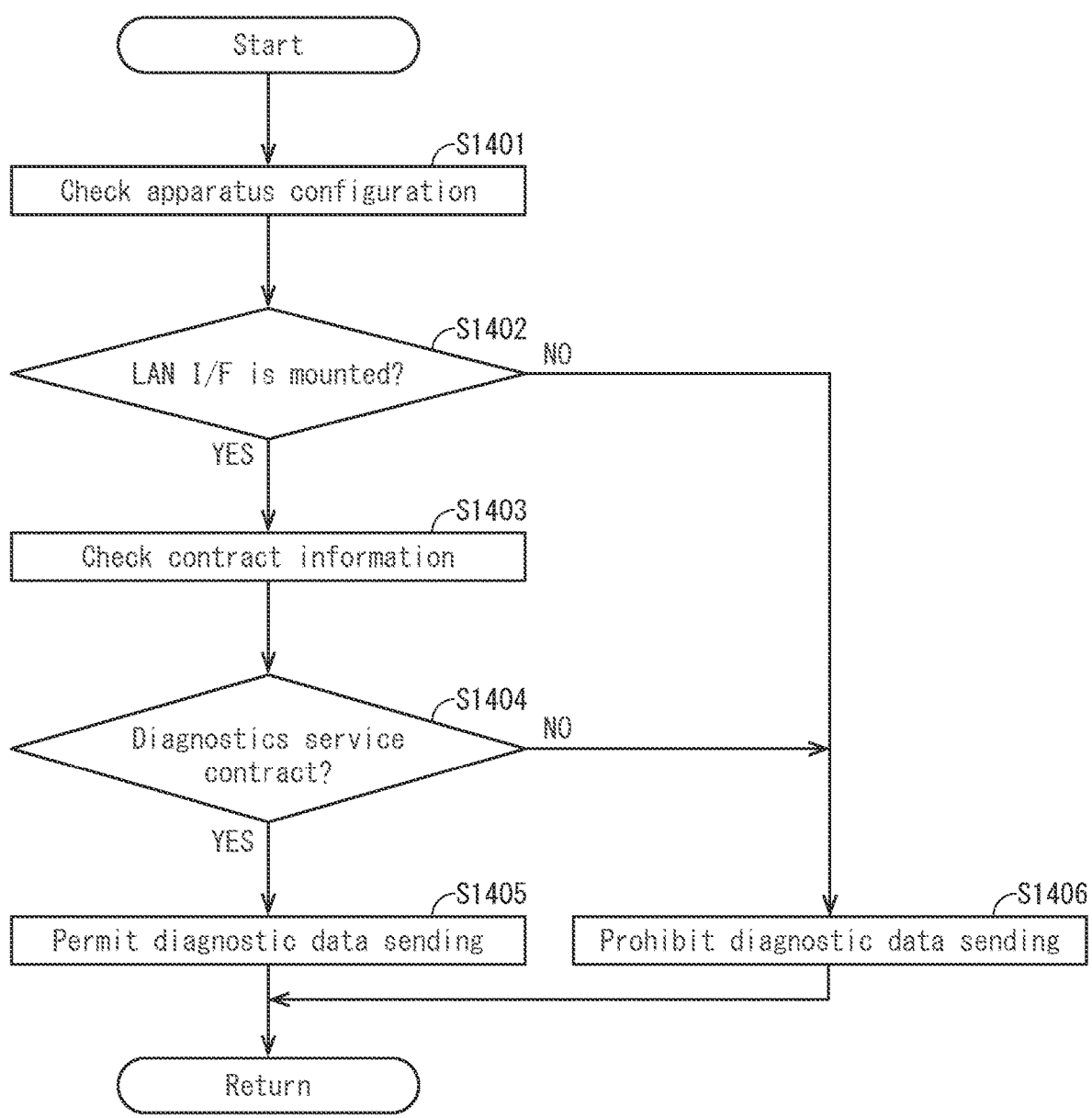
FIG. 14 is a flowchart describing operations of a secondary controller 200 according to a fifth embodiment.

As shown in FIG. 14, upon power-on of the image forming apparatus 100, the secondary controller 200 refers to the apparatus configuration of the image forming apparatus 100 to check whether the LAN interface 400 is mounted therein (S1401). Here, the apparatus configuration of the image forming apparatus 100 is for example as follows. At shipment from factories or upon configuration change, the apparatus configuration is registered in an HDD 414 of the primary controller 201. Upon power-on of the image forming apparatus 100 for example, the primary controller 201 notifies the secondary controller 200 of the apparatus configuration. The secondary controller 200 stores the apparatus configuration thus received onto the RAM 403, and reads the apparatus configuration from the RAM 403 as necessary.

In the case where the LAN interface 400 is not mounted in the secondary controller 200 (S1402: NO), the secondary controller 200 is prohibited from sending diagnostic data to the diagnostic server 101 (S1406).

Meanwhile, in the case where the LAN interface 400 is mounted in the secondary controller 200 (S1402: YES), the secondary controller 200 refers to contract information recorded in a ROM 402 thereof to check whether a diagnostics service contract is made (S1403). In the case where the diagnostics service contract is not made (S1404: NO), the secondary controller 200 is prohibited from sending diagnostic data to the diagnostic server 101 (S1406).

Meanwhile, in the case where the diagnostics service contract is made (S1404: YES), the secondary controller 200 is permitted to send diagnostic data to the diagnostic server 101 (S1405).

With this configuration, it is possible to prevent the secondary controller 200 from unnecessarily sending diagnostic data to the diagnostic server 101, thereby preventing an increase in processing loads on the secondary controller 200 and the diagnostic server 101 and preventing an increase in load on the communication network 110. This is effective to reduce the processing loads on the diagnostic server 101 particularly in the case where many image forming apparatuses 100 are under the diagnostic server 101.

[6] Sixth Embodiment

In an image forming apparatus diagnostic system 1 according to one or more embodiments, a secondary controller 200 of an image forming apparatus 100 calculates a mean value of the sheet arrival period T to an extent that a diagnostic server 101 can sense occurrence of a recording sheet sliding, and sends the calculated mean value to the diagnostic server 101.

Figure 15:
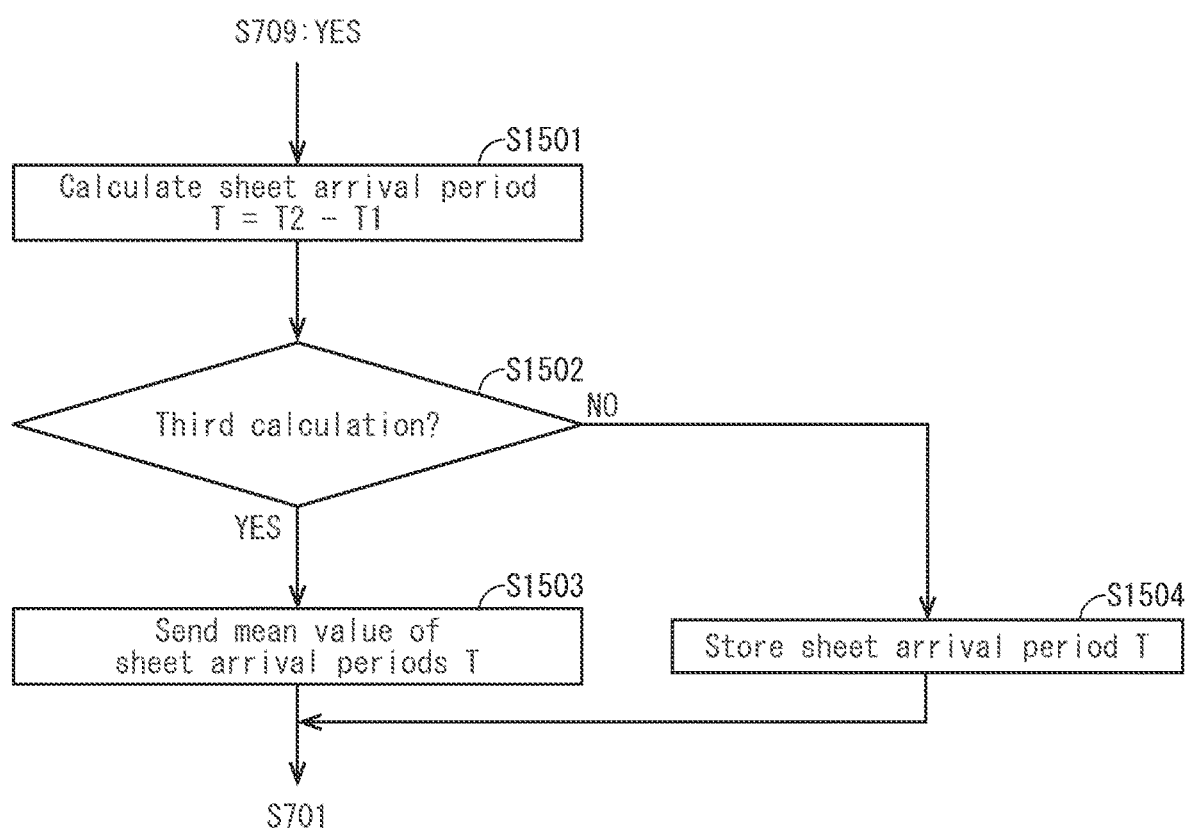
FIG. 15 is a flowchart describing operations of a secondary controller 200 according to a sixth embodiment.

FIG. 15 is a flowchart describing operations of the secondary controller 200, and specifically shows processing performed following Step S709: YES in FIG. 7.

As shown in FIG. 15, the secondary controller 200 calculates a sheet arrival period T (S1501). In the case where this calculation of the sheet arrival period T is the third calculation after the last sending of a mean value of sheet arrival periods T to the diagnostic server 101 (S1502: YES), the secondary controller 200 calculates a mean value of the last three sheet arrival periods T and sends the calculated mean value to the diagnostic server 101 (S1503). Meanwhile, in the case where the calculation of the sheet arrival period T in Step S1501 does not reach the third calculation (S1502: NO), the secondary controller 200 stores therein the sheet arrival period T for later mean value calculation (S1504). After Step S1503 or S1504, the flow returns to Step S701 in FIG. 7 to repeat the processing described above.

As shown in FIG. 16A, the secondary controller 200 calculates a mean value of three sheet arrival periods T of recording sheets 1 to 3, and sends not the separate sheet arrival periods T but only the calculated mean value to the diagnostic server 101. Also, as shown in FIG. 16B, multiple image forming apparatuses 100 each send only the mean value to the diagnostic server 101.

Assume, for example, that an image forming apparatus 100 performs image formation at a speed of 60 sheets per minute and sends all the sheet arrival periods T to the diagnostic server 101. In this case, the sheet arrival period T is sent every second. In addition, in the case where multiple image forming apparatuses 100 having this image formation speed are used, sheet arrival periods T corresponding in number to the multiple image forming apparatuses 100 are sent every second. This causes an increase in load on the communication network 110.

According to one or more embodiments, meanwhile, not the sheet arrival periods T but their mean value is sent to the diagnostic server 101, such that the number of sending diagnostic data decreases to one over the number of sheet arrival periods T which are used for mean value calculation. In this sense, an amount of diagnostic data is compressed.

Figures 17A, 17B:
FIG. 17A is a table exemplifying a sheet count, the sheet arrival period T and the mean value of sheet arrival periods T in the case where a recording sheet sliding has occurred.
FIG. 17B is a table exemplifying the sheet count, the sheet arrival period T and the mean value of sheet arrival periods T in the case where no recording sheet sliding has occurred according to one or more embodiments.

Also, such a decrease in number of sheet arrival periods T used for mean value calculation achieves a highly precise sensing of occurrence of a recording sheet sliding. For example, occurrence of a recording sheet sliding corresponds to only one sheet arrival periods T among three sheet arrival periods T used for mean value calculation as shown in FIG. 17A. A mean value of 268.0 milliseconds calculated from these three sheet arrival periods T is larger by 6.7 milliseconds than a mean value of 261.3 milliseconds calculated from three sheet arrival periods T corresponding to no occurrence of a recording sheet sliding as shown in FIG. 17B.

That is, the number of sheet arrival periods T used for mean value calculation is adopted such that a mean value of sheet arrival periods T corresponding to occurrence of a recording sheet sliding is always larger than a mean value of those corresponding no occurrence of a recording sheet sliding. A median value of these two-type mean values is used as a threshold value for comparison with each mean value of sheet arrival periods T, and this achieves a highly precise sensing of occurrence of a recording sheet sliding, that is, deterioration of the feed roller 302 and so on.

[7] Seventh Embodiment

In an image forming apparatus diagnostic system 1 according to one or more embodiments, a secondary controller 200 is set to send all sheet arrival periods T or only a mean value of the sheet arrival periods T to a diagnostic server 101. With use of an operation panel 202 for example, a format of sending diagnostic data to the diagnostic server 101 (hereinafter, referred to as diagnostic data format) is set to "all values" or "mean value". While the diagnostic data format "all values" indicates to send all the sheet arrival periods T, the diagnostic data format "mean value" indicates to send only a mean value of sheet arrival periods T. The set value of diagnostic data format is for example stored in an HDD 414 of a primary controller 201, and is notified from the primary controller 201 to the secondary controller 200 upon power-on for example.

Figure 18:
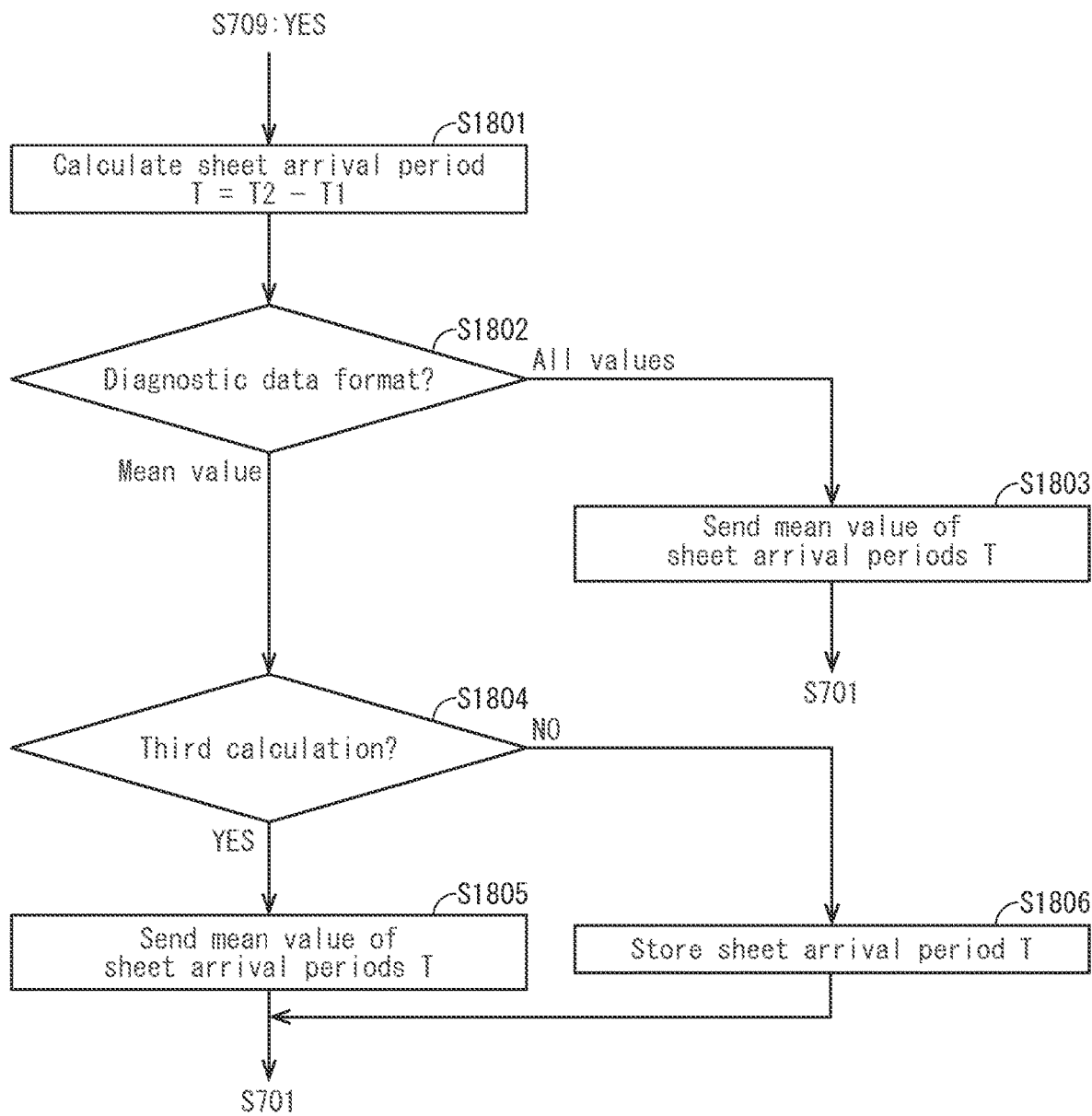
FIG. 18 is a flowchart describing operations of a secondary controller 200 according to a seventh embodiment.

FIG. 18 is a flowchart describing operations of the secondary controller 200, and specifically shows processing performed following Step S709: YES in FIG. 7.

As shown in FIG. 18, the secondary controller 200 calculates a sheet arrival period T (S1801). In the case where the diagnostic data format is set to "all values" (S1802: All values), the secondary controller 200 sends the calculated sheet arrival period T to the diagnostic server 101 (S1803).

Meanwhile, in the case where the diagnostic data format is set to "mean value" (S1802: Mean value), the secondary controller 200 determines whether the calculation of the sheet arrival period T in Step S1801 is the third calculation after the last sending of a mean value of the sheet arrival periods T to the diagnostic server 101 (S1804). In the case where the calculation in Step S1801 is the third calculation after the last sending (S1804: YES), the secondary controller 200 calculates a mean value of the last three sheet arrival periods T and sends the calculated mean value to the diagnostic server 101 (S1805). Meanwhile, in the case where the calculation in Step S1801 does not reach the third calculation (S1804: NO), the secondary controller 200 stores therein the sheet arrival period T for later mean value calculation (S1806). After Step S1803, S1805, or S1806, the flow returns to Step S701 in FIG. 7 to repeat the processing described above.

According to one or more embodiments, in the case where the diagnostic data format is set to "all values", each time a sheet arrival period T as exemplified in FIG. 19A is obtained, the sheet arrival period T is sent to the diagnostic server 101.

Meanwhile, in the case where the diagnostic data format is set to "mean value", as exemplified in FIG. 19B, a mean value is calculated from three consecutive sheet arrival periods T and only the calculated mean value is sent to the diagnostic server 101. The sheet arrival periods T are not sent to the diagnostic server 101. In this case, as exemplified in FIG. 19C, mean values of sheet arrival periods T are stored in the diagnostic server 101 in order of reception.

With this configuration, the diagnostic data format is set depending on the loads on the communication network 110, thereby preventing an overload on the communication network 110 due to sending of diagnostic data from the image forming apparatus 100 to the diagnostic server 101.

Also, in the case where the load on the communication network 110 is small or in the case where the communication capacity of the communication network 110 is large enough, setting the diagnostic data format to "all values" improves the precision of failure diagnostics and lifespan diagnostics performed by the diagnostic server 101.

Note that, to identify which diagnostic data format is set to diagnostic data sent from the image forming apparatus 100, information identifying the set diagnostic data format may be attached to the diagnostic data. Alternatively, upon setting of the diagnostic data format in the image forming apparatus 100, the set diagnostic data format may be sent to the diagnostic server 101.

Switching the diagnostic data format might cause mixture of sheet arrival periods T and their mean values accumulated as diagnostic data in the diagnostic server 101. According to one or more embodiments, each time receiving and storing diagnostic data, the diagnostic server 101 identifies whether the diagnostic data indicates a sheet arrival period T or a mean value of sheet arrival periods T, thereby performing failure diagnostics and lifespan diagnostics with use of the identified diagnostic data.

[8] Eighth Embodiment

In an image forming apparatus diagnostic system 1 according to one or more embodiments, a LAN interface 400 is an optional component which is optionally mounted in a secondary controller 200 of an image forming apparatus 100. In the case where the LAN interface 400 is mounted in the secondary controller 200, the secondary controller 200 sends diagnostic data to a diagnostic server 101 by the LAN interface 400. Meanwhile, in the case where the LAN interface 400 is not mounted in the secondary controller 200, the secondary controller 200 sends diagnostic data to the diagnostic server 101 via a primary controller 201.

Figure 20:
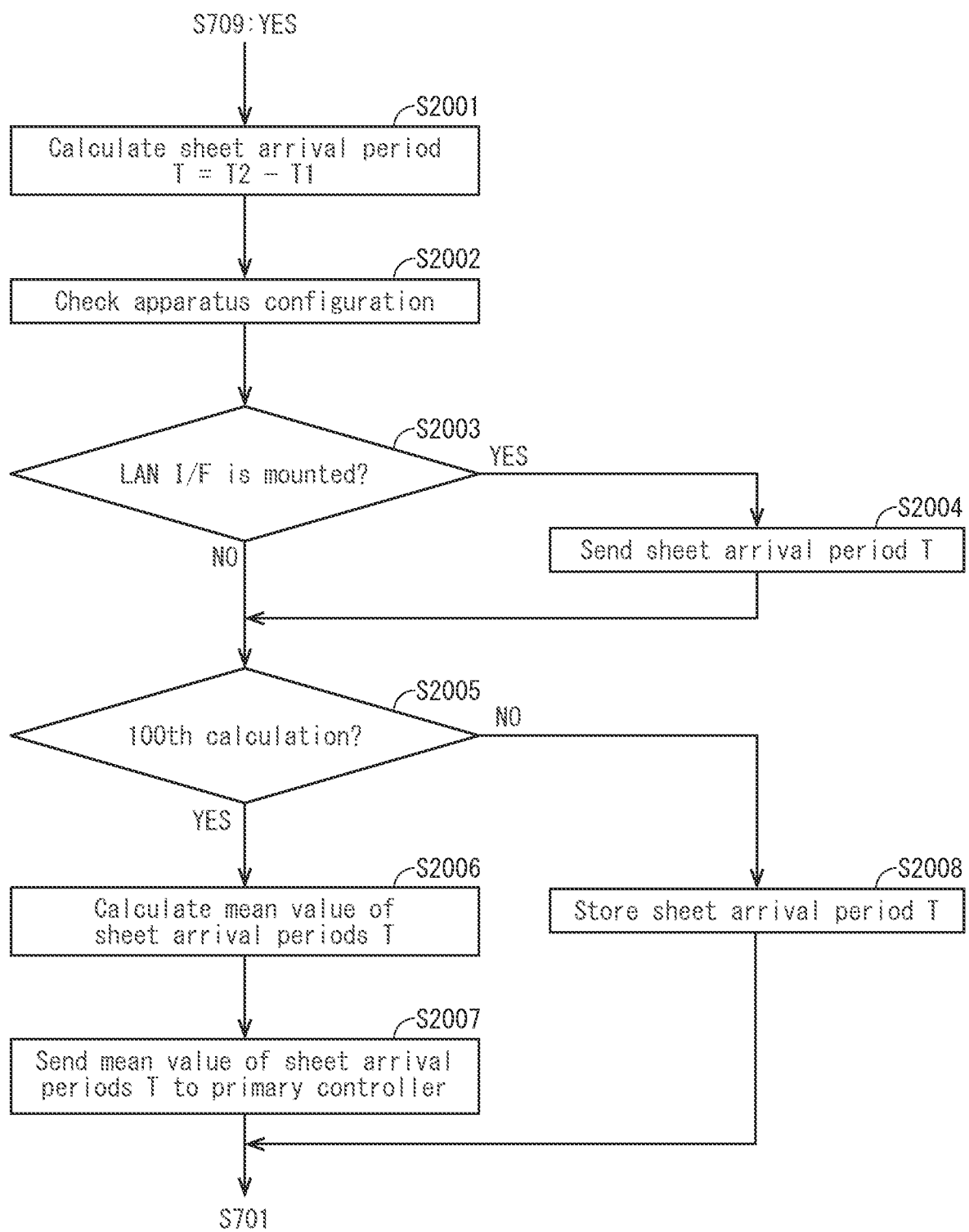
FIG. 20 is a flowchart describing operations of a secondary controller 200 according to an eighth embodiment.

FIG. 20 is a flowchart describing operations of the secondary controller 200, and specifically shows processing performed following Step S709: YES in FIG. 7.

As shown in FIG. 20, the secondary controller 200 calculates a sheet arrival period T (S2001), and refers to the apparatus configuration of the image forming apparatus 100 to check whether the LAN interface 400 is mounted therein (S2002). In the case where the LAN interface 400 is mounted in the secondary controller 200 (S2003: YES), the secondary controller 200 sends the sheet arrival period T to the diagnostic server 101 by the LAN interface 400 (S2004).

In the case where the LAN interface 400 is not mounted in the secondary controller 200 meanwhile (S2003: NO), or after Step S2004, the secondary controller 200 refers to the number of calculating sheet arrival periods T after the last sending of the sheet arrival period T or a mean value of sheet arrival periods T to the diagnostic server 101. In the case where the calculation of the sheet arrival period T in Step S2001 does not reach the 100th calculation after the last sending (S2005: NO), the secondary controller 200 stores therein the calculated sheet arrival period T (S2008).

Note that the number of sheet arrival periods T used for mean value calculation may be any value other than 100 within a range that the communication load between the secondary controller 200 and the primary controller 201 can be suppressed. However, this number of sheet arrival periods T may fall within a value range which does not excessively lower the precision of failure diagnostics and lifespan diagnostics performed by the diagnostic server 101

Meanwhile, in the case where the calculation of the sheet arrival period T in Step S2001 reaches the 100th calculation (S2005: YES), the secondary controller 200 calculates a mean value of the last 100 sheet arrival periods T (S2006). Further, the secondary controller 200 sends the calculated mean value to the primary controller 201 by the UART 405 (S2007). Upon receiving the mean value from the secondary controller 200, the primary controller 201 sends the mean value as diagnostic data to the diagnostic server 101.

After Step S2007 or S2008, the flow returns to Step S701 in FIG. 7 to repeat the processing described above. Note that in the case where the LAN interface 400 is mounted in the secondary controller 200 (S2003: YES), the mean value and the sheet arrival periods T used for calculating the mean value should have attached thereto information indicating a correspondence therebetween.

FIG. 21A exemplifies the sheet arrival period T and the mean value of sheet arrival periods T. As shown in the figure, sheet arrival periods T and a mean value thereof have attached thereto an ID clearly indicating a correspondence therebetween. As shown in FIG. 21B, in the case where the mean value of the sheet arrival periods T is sent as diagnostic data to the diagnostic server 101, the mean value and the sheet arrival periods T both have attached thereto an ID such that the correspondence therebetween is clearly presented to the diagnostic server 101.

As shown in FIG. 21C, the ID, which identifies the correspondence between the sheet arrival periods T and the mean value thereof, is also stored together with the diagnostic data accumulated in the diagnostic server 101. Analysis of the accumulated diagnostic data is performed not only for each piece of sheet but also for the mean value of 100 pieces of sheets. In the case where analysis is performed for the mean value of 100 pieces of sheets, the sheet arrival period T for each of the 100 pieces of sheets is also used, thereby improving the precision of failure diagnostics and lifespan diagnostics.

In the case where the LAN interface 400 is not mounted in the secondary controller 200, only the mean value is sent without the corresponding sheet arrival periods T to the diagnostic server 101 via the primary controller 201, and thus it is not necessary to attach an ID to the mean value.

Also, an ID may be attached to diagnostic data to be sent to the diagnostic server 101, such that the diagnostic server 101 identifies whether the diagnostic data indicates a sheet arrival period T or a mean value of sheet arrival periods T. Furthermore, when the LAN interface 400 is mounted and removed from the secondary controller 200, information indicating the mount and removal of the LAN interface 400 may be sent to the diagnostic server 101, such that the diagnostic server 101 identifies whether diagnostic data indicates a sheet arrival period T or a mean value of sheet arrival periods T.

With this configuration, the mean value is sent at a low frequency which is one-hundredth a calculation frequency of sheet arrival period T. This suppresses the communication load between the secondary controller 200 and the primary controller 201 to prevent delay of image forming processing and so on, during failure diagnostics and lifespan diagnostics performed by the diagnostic server 101.

[9] Ninth Embodiment

In an image forming apparatus diagnostic system 1 according to one or more embodiments, after a diagnostic server 101 performs failure diagnostics and lifespan diagnostics with use of sheet arrival periods T, a parent diagnostic server analyzes a mean value of the sheet arrival periods T and a diagnostics result of the diagnostic server 101, and feeds an analysis result back to the diagnostic server 101. This updates the algorithms for failure diagnostics and lifespan diagnostics to improve the precision of failure diagnostics and lifespan diagnostics.

Figure 22:
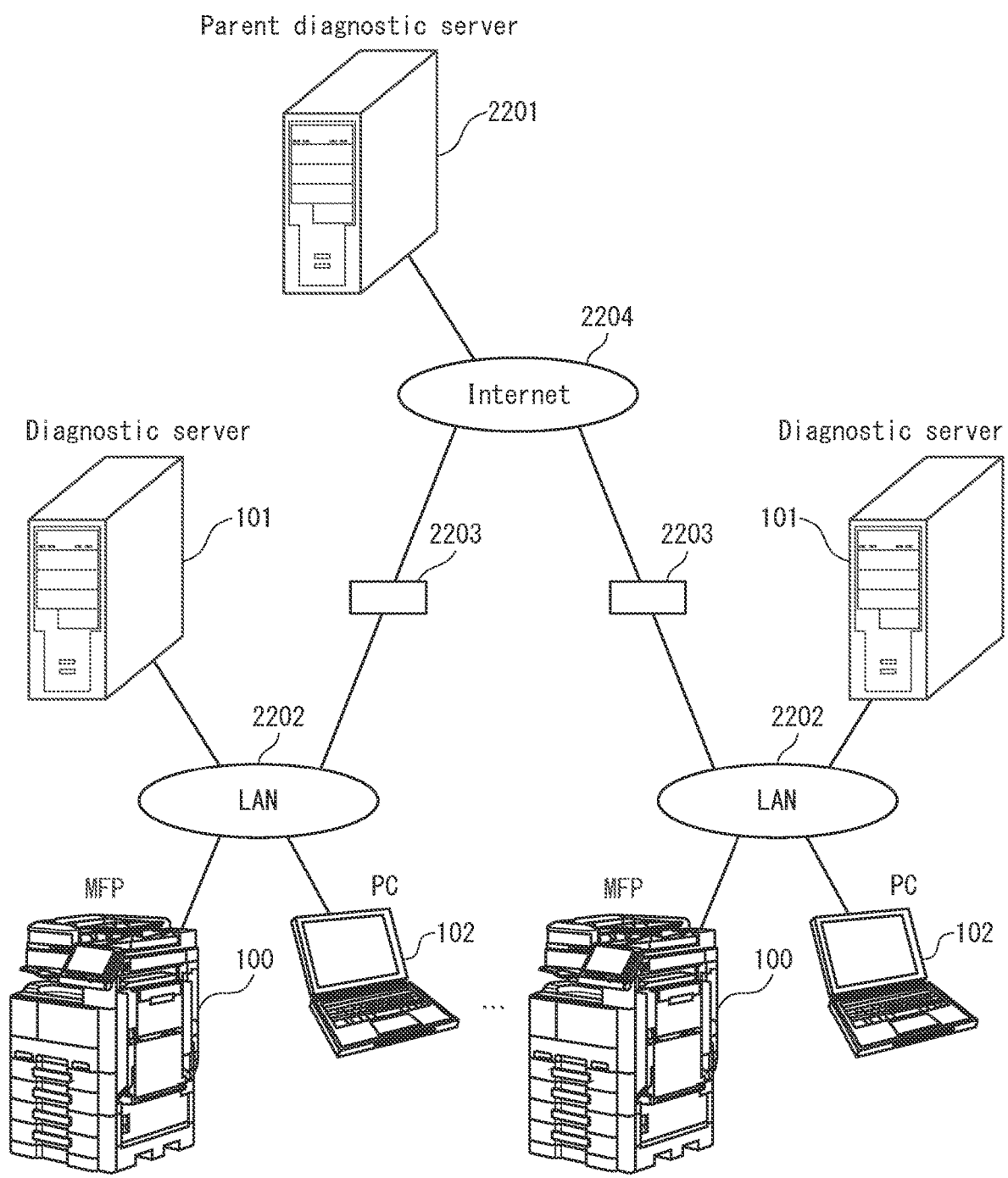
FIG. 22 shows main components of an image forming apparatus diagnostic system 1 according to a ninth embodiment.

As shown in FIG. 22, the image forming apparatus diagnostic system 1 according to one or more embodiments includes multiple in-house systems. The in-house systems each include an image forming apparatus 100, a diagnostic server 101, and a PC 102 which are connected to a LAN 2202. The LAN 2202 is connected to an Internet 2204 via a router 2203. A parent diagnostic server 2201 is connected to the Internet 2204 to communicate with the diagnostic server 101 via the Internet 2204 for example.

Figure 23A:
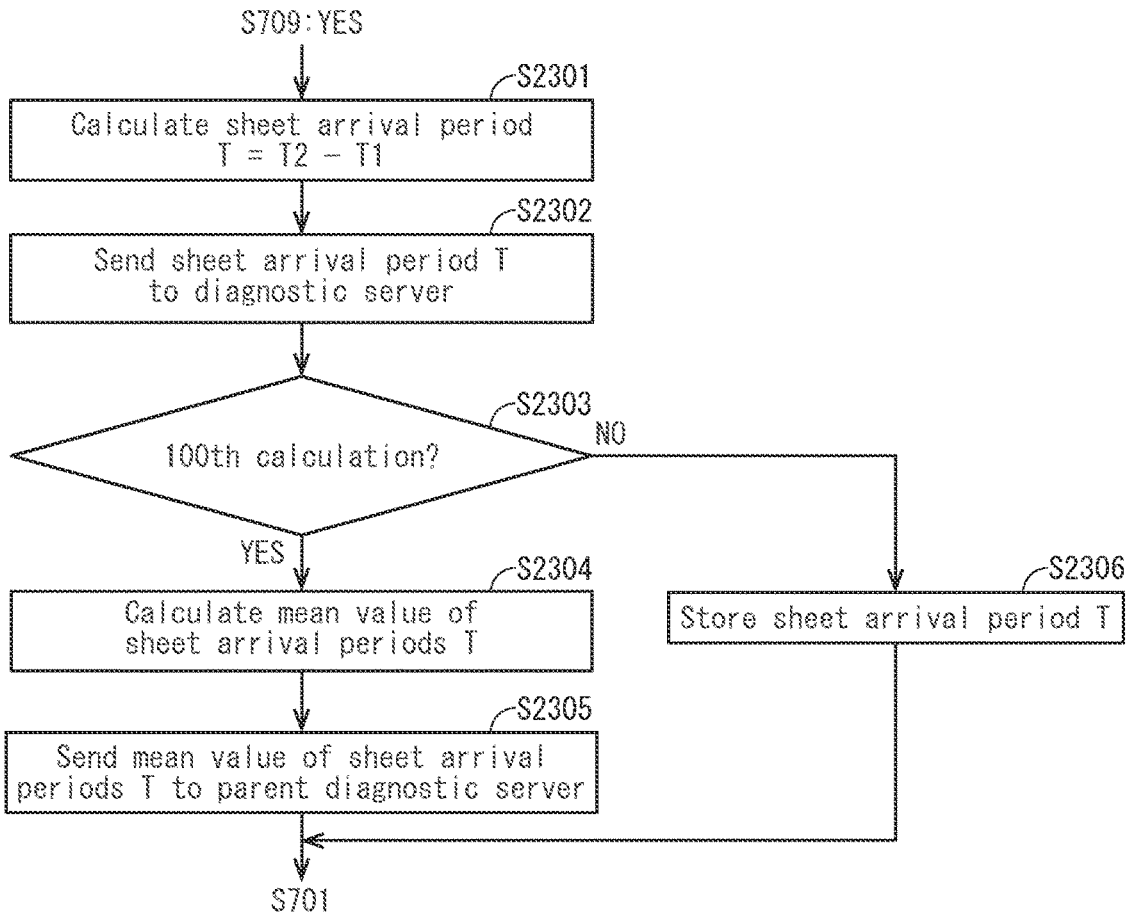
FIG. 23A is a flowchart describing operations of a secondary controller 200 according to the ninth embodiment.

FIG. 23A is a flowchart describing operations of a secondary controller 200, and specifically shows processing performed following Step S709: YES in FIG. 7.

As shown in FIG. 23A, the secondary controller 200 calculates a sheet arrival period T (S2301). Here, FIG. 24A exemplifies the sheet arrival periods T calculated by the secondary controller 200. Then, the secondary controller 200 sends the sheet arrival period T to the diagnostic server 101 (S2302). Here, FIG. 24B exemplifies the sheet arrival periods T sent by the secondary controller 200 to the diagnostic server 101.

Figure 23B:
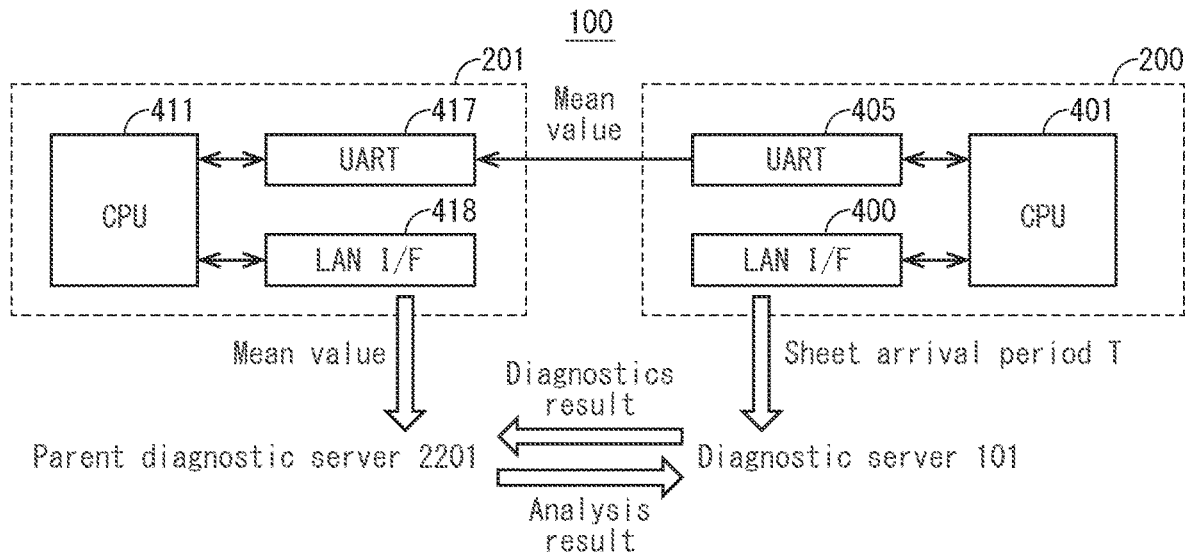
FIG. 23B is a block diagram showing main components of the secondary controller 200 and a primary controller 201 according to one or more embodiments.

In this case, the secondary controller 200 sends the sheet arrival period T by the LAN interface 400 to the diagnostic server 101 via the LAN 2202, as shown in FIG. 23B. The diagnostic server 101 accumulates therein the sheet arrival periods T as exemplified in FIG. 24D, performs failure diagnostics and lifespan diagnostics with use of the sheet arrival periods T, and sends a diagnostics result to the parent diagnostic server 2201 via the LAN 2202 and the Internet 2204.

Then, the secondary controller 200 refers to the number of calculating sheet arrival periods T after the last sending of the mean value of the sheet arrival periods T to the diagnostic server 101. In the case where the calculation of the sheet arrival period T in Step S2301 does not reach the 100th calculation after the last sending (S2303: NO), the secondary controller 200 stores therein the calculated sheet arrival period T (S2306). Meanwhile, in the case where the calculation of the sheet arrival period T in Step S2301 reaches the 100th calculation (S2303: YES), the secondary controller 200 calculates a mean value of the last 100 sheet arrival periods T (S2304).

FIG. 24A also exemplifies the mean value of the sheet arrival periods T. The secondary controller 200 sends the mean value to the parent diagnostic server 2201 (S2305). Here, FIG. 24C exemplifies the mean value of the sheet arrival periods T sent by the secondary controller 200 to the parent diagnostic server 2201.

In this case, the secondary controller 200 sends the mean value by the UART 405 to the primary controller 201, as shown in FIG. 23B. Upon receiving the mean value by a UART 417, the primary controller 201 sends the mean value by a LAN interface 418 to the parent diagnostic server 2201 via the LAN 2202 and the Internet 2204. The parent diagnostic server 2201 accumulates therein the received mean value.

Note that an ID is attached to sheet arrival periods T, a mean value calculated from the sheet arrival periods T, and a diagnostics result obtained with use of the sheet arrival periods T, such that their correspondence is identified. With reference to the ID of the diagnostics result received from the diagnostic server 101, the parent diagnostic server 2201 refers to the mean value, which corresponds to the diagnostics result, received from the image forming apparatus 100, to analyze the diagnostics result. An analysis result of the parent diagnostic server 2201 is fed back to the algorithms for failure diagnostics and lifespan diagnostics to improve the diagnosis precision.

The diagnostic server 101 performs failure diagnostics and lifespan diagnostics, for example at 12:00 a.m. once a week, and sends a diagnostics result to the parent diagnostic server 2201. FIG. 25A exemplifies a lifespan diagnostics result as a diagnostics result sent by the diagnostic server 101 to the parent diagnostic server 2201. The parent diagnostic server 2201 sequentially accumulates therein and analyzes diagnostics results received from the diagnostic server 101. FIG. 25B exemplifies diagnostic data accumulated in the parent diagnostic server 2201.

As exemplified in FIG. 25B, the parent diagnostic server 2201 sequentially accumulates therein mean values of sheet arrival periods T received from the image forming apparatus 100 and a diagnostics result received from the diagnostic server 101. In this case, the mean value and the diagnostics result, which are sent to the parent diagnostic server 2201, have attached thereto an ID clearly indicating their correspondence, and the diagnostics result also has attached thereto a sheet count, which indicates the number of calculating sheet arrival periods T, and an internet protocol (IP) address of an image informing apparatus. These information pieces, which are attached to the mean value and the diagnostics result, are also accumulated in the parent diagnostic server 2201.

[10] Tenth Embodiment

In an image forming apparatus diagnostic system 1 according to one or more embodiments, an image forming apparatus 100 sends the maximum value of sheet arrival periods T to a diagnostic server 101.

FIG. 26 is a flowchart describing operations of a secondary controller 200, and specifically shows processing performed following Step S709: YES in FIG. 7.

As shown in FIG. 26, the secondary controller 200 calculates a sheet arrival period T (S2601), and compares the calculated sheet arrival period T with the maximum value Tmax of sheet arrival periods T (S2602). In the case where the calculated sheet arrival period T is larger than the maximum value Tmax (S2602: YES), the secondary controller 200 updates the maximum value Tmax with the calculated sheet arrival period T (S2603).

In the case where the calculated sheet arrival period T is equal to or less than the maximum value Tmax meanwhile (S2602: NO), or after Step S2603, the secondary controller 200 refers to the number of calculating sheet arrival periods T after the last sending of the maximum value Tmax of sheet arrival periods T (S2604). In the case where the calculation in Step S2601 reaches the 10th calculation after the last sending (S2604: YES), the secondary controller 200 sends the maximum value Tmax of the sheet arrival periods T to the diagnostic server 101 (S2605), and then initializes the maximum value Tmax to zero (S2606).

In the case where the calculation in Step S2601 does not reach the 10th calculation after the last sending of the maximum value Tmax meanwhile (S2604: NO), or after Step S2606, the flow returns to Step S701 in FIG. 7 to repeat the processing described above.

In an example in FIG. 27A, sheet arrival periods T are calculated for 10 recording sheets and their maximum value is 262 milliseconds. The secondary controller 200 thus checks the sheet arrival period T for the 10th recording sheet, and then sends the maximum value of 262 milliseconds to the diagnostic server 101. In this case, the sent maximum value may have attached thereto format information indicating that data sent to the diagnostic server 101 indicates the maximum value for each 10 recording sheets, as exemplified in FIG. 27B.

Thus, the diagnostic server 101 performs failure diagnostics and lifespan diagnostics, distinctively between the case where sheet arrival periods T for all recording sheets are sent and the case where only the maximum value of sheet arrival periods T is sent. As shown in FIG. 27C, the diagnostic server 101 accumulates therein the maximum values received from the secondary controller 200 for failure diagnostics and lifespan diagnostics.

With this configuration, a suddenly increased or decreased value of sheet arrival periods T is sent from the secondary controller 200 to the diagnostic server 101, unlike the case where a mean value of sheet arrival periods T is sent from the secondary controller 200 to the diagnostic server 101. Also, since the maximum value is sent for each 10 recording sheets, the minimized time lag is generated between occurrence of a sudden increase or decrease and sending of the maximum value to the diagnostic server 101.

Note that the minimum value may be sent, instead of the maximum value, from the secondary controller 200 to the diagnostic server 101. Alternatively, both the maximum value and the minimum value may be sent. Both in these cases, an amount of diagnostic data is compressed as well as in the case where only the maximum value is sent.

As shown in FIG. 28A, in the case for example where only the minimum value is sent, a sheet arrival period is obtained for each of 10 consecutive recording sheets to be used for image formation and their minimum value is calculated. In an example in the figure, the minimum value of 10 calculated sheet arrival periods is 260 milliseconds.

As shown in FIG. 28B, the minimum value of 260 milliseconds having attached thereto a value "1" as format information is sent from the secondary controller 200 to the diagnostic server 101. The format information has a value "1" which indicates sending of the minimum value of sheet arrival periods T for each 10 recording sheets, and has a value "0" which indicates sending of a sheet arrival period T for each recording sheet. With this configuration, the diagnostic server 101 performs appropriate failure diagnostics and lifespan diagnostics according to the format of diagnostic data.

[11] Modifications

The present disclosure has been described based on the above embodiments, but is of course not limited to the above embodiments and includes the following modifications.

(11-1) In the above embodiments, the description has been given with use of the example where main diagnostic data is the sheet arrival period T. However, the present disclosure is of course not limited to this, and the following diagnostic data may be used instead of or in addition to the sheet arrival period T.

For example, diagnostic data may be a photoreceptor current value. Photoreceptor current indicates a current flowing from the photosensitive drum 331 to the earth during a potential drop of the photosensitive drum 331 due to charging and exposure. As a film thickness of the photosensitive drum 331 decreases, an electrostatic capacitance of the photosensitive drum 331 increases and thus the photoreceptor current increases.

Focusing on this point, the secondary controller 200 measures the photoreceptor current by a photoreceptor current sensor and sends a measured value to the diagnostic server 101, such that the diagnostic server 101 estimates the film thickness of the photosensitive drum 331 to perform lifespan diagnostics of the photosensitive drum 331. The photoreceptor current may be measured at multiple points, at for example 10 points, on the surface of the photosensitive drum 331, and all the measured values may be sent to the diagnostic server 101.

Alternatively, diagnostic data may be a drive current value of the fixing motor 326. Deterioration of the surface of the fixing roller 312 increases the torque for driving the fixing roller 312 to rotate to the fixing roller 312, and thus increases the drive current of the fixing motor 326. Focusing on this point, the secondary controller 200 may send the drive current value of the fixing motor 326 to the diagnostic server 101, such that the diagnostic server 101 performs failure diagnostics and lifespan diagnostics of the fixing roller 312.

The drive current of the fixing motor 326 varies depending on for example feeding of recording sheets or a temperature variation of the fixing roller 312. In view of this, the drive current value of the fixing motor 326 may be measured under predefined conditions (measurement mode) 10 times and all the measured values for the 10 times may be sent to the diagnostic server 101.

Alternatively, the secondary controller 200 may form a predefined toner patch on the intermediate transfer belt 310 during image stabilization processing or the like, measure a density of the toner patch at for example 10 points by an image density control (IDC) sensor, and send the measured values for all the 10 points to the diagnostic server 101. With this configuration, the diagnostic server 101 refers to the measured density values thereby to perform failure diagnostics and lifespan diagnostics of the intermediate transfer belt 310, the primary transfer roller 504, the photosensitive drum 331, and so on.

Alternatively, the secondary controller 200 may measure a secondary transfer voltage under predefined conditions at for example 10 points by a transfer voltage sensor, and send the measured values for all the 10 points to the diagnostic server 101. With this configuration, the diagnostic server 101 refers to the secondary transfer voltage values thereby to perform failure diagnostics and lifespan diagnostics of the secondary transfer roller 307, the intermediate transfer belt 310, and so on.

(11-2) Although not specifically stated in the above embodiments, the diagnostic server 101 and the parent diagnostic server 2201 each may be either a so-called computer or a cloud server. Both in the cases, the effects described in the above embodiments are achieved by applying the present disclosure.

(11-3) In the above embodiments, the description has been given with use of the example where the image forming apparatus 100 is a tandem-type color MFP. However, the present disclosure is of course not limited to this, and the image forming apparatus according to the present disclosure may be either a color MFP of a type other than the tandem-type or a monochrome MFP. Also, the same effects are achieved by applying the present disclosure to single function peripherals (SFPs) such as printers, copiers, and facsimiles.

[12] Summary of Embodiments and Modifications

The above embodiments and modifications are summarized as follows. An image forming apparatus according to one or more embodiments is an image forming apparatus that sends diagnostic data to a diagnostic server such that the diagnostic server performs failure diagnostics and lifespan diagnostics. The image forming apparatus includes: an image forming unit that performs image forming processing on a recording sheet; a secondary controller; a primary controller that receives a job externally and issues, to the secondary controller, an instruction to monitor and control the image forming unit to perform the image forming processing; and sensors that sense a state of the image forming unit and output sensor data indicating the state of the image forming unit. The secondary controller monitors the sensor data to generate diagnostic data, and includes: a first communication unit that performs duplex communication with the primary controller to send and receive data other than the diagnostic data; and a second communication unit that sends the diagnostic data to the diagnostic server without relaying via the primary controller.

According to Japanese Patent Application Publication No. 2006-30258, two separate communication paths are provided between an image forming apparatus and a plurality of finishing apparatuses. Similarly, according to Japanese Patent Application Publication No. 2018-92593, two separate communication paths are provided between a main device and a control device in an information processing apparatus. Unlike these conventional techniques, according to the configuration of the image forming apparatus according to one or more embodiments, the secondary controller sends diagnostic data to the diagnostic server without relaying via the primary controller, such that the frequency of sending diagnostic data to the diagnostic server is increased with neither an increase of communication load between the secondary controller and the primary controller nor an increase of loads on the primary controller for processing communication data. This improves the precision of failure diagnostics and lifespan diagnostics performed by the diagnostic server.

According to one or more embodiments, the diagnostic data includes at least one of the sensor data and data obtained by processing the sensor data.

According to one or more embodiments, the diagnostic server is connected to a communication network, and the second communication unit sends the diagnostic data to the diagnostic server via the communication network.

According to one or more embodiments, the diagnostic server is connected to a communication network, and the second communication unit sends the diagnostic data to the diagnostic server via a device that is connected to the communication network.

According to one or more embodiments, the device is a personal computer.

According to one or more embodiments, the device is a portable communication device.

According to one or more embodiments, the device is a server device that is further connected to a local area network, and the second communication unit sends the diagnostic data to the diagnostic server via the local area network and the server device.

According to one or more embodiments, the secondary controller determines whether sending of the diagnostic data by the second communication unit to the diagnostic server is necessary, and when determining negatively, the secondary controller prohibits sending of the diagnostic data by the second communication unit to the diagnostic server.

According to one or more embodiments, the diagnostic data includes the sensor data, outputted from any of the sensors, in an uncompressed format.

According to one or more embodiments, the diagnostic data includes compressed sensor data obtained by compressing the sensor data outputted from any of the sensors.

According to one or more embodiments, the diagnostic data further includes the sensor data, and the sensor data and the compressed sensor data each have attached thereto identification data indicating a correspondence therebetween.

According to one or more embodiments, the secondary controller receives an instruction indicating whether to compress the sensor data, when the received instruction indicates to compress the sensor data, the diagnostic data includes the sensor data in a compressed format, and when the received instruction indicates not to compress the sensor data, the diagnostic data includes the sensor data in an uncompressed format.

According to one or more embodiments, the secondary controller compresses the sensor data to obtain compressed sensor data, and attaches identification data to the sensor data and the compressed sensor data, the identification data indicating a correspondence therebetween, the first communication unit sends the compressed sensor data as the diagnostic data to the diagnostic server via the primary controller, and the second communication unit sends the sensor data as the diagnostic data to the diagnostic server.

According to one or more embodiments, the secondary controller calculates, as the compressed sensor data, at least one of a mean value, a maximum value, and a minimum value of a predefined number of pieces of the sensor data.

According to one or more embodiments, the image forming unit includes: a feed tray that houses therein recording sheets for image formation; and a feed roller that feeds the recording sheets from the feed tray, and the diagnostic data includes a sheet arrival period necessary for conveying a recording sheet from a first position downstream of the feed roller in a sheet conveyance direction to a second position downstream of the first position in the sheet conveyance direction.

According to one or more embodiments, the image forming unit includes a photoreceptor for toner image formation by an electrophotographic system, and the diagnostic data includes a surface state of the photoreceptor.

According to one or more embodiments, the image forming unit includes: rotary members for image formation; and driving motors that drive the rotary members to rotate, and the diagnostic data may include torque values of the driving motors.

According to one or more embodiments, the image forming unit is a tandem-type image forming unit, and includes an intermediate transfer belt that conveys a toner image after a primary transfer to a secondary transfer position, and the diagnostic data includes a deposition amount of toner carried on the intermediate transfer belt.

According to one or more embodiments, the image forming unit includes a transfer unit that performs electrostatic transfer of a toner image onto a recording sheet, and the diagnostic data includes a transfer voltage for the electrostatic transfer.

An image forming apparatus diagnostic system according to one or more embodiments is an image forming apparatus diagnostic system including an image forming apparatus and a diagnostic server. The image forming apparatus includes: an image forming unit that performs image forming processing on a recording sheet; a secondary controller; a primary controller that receives a job externally and issues, to the secondary controller, an instruction to monitor and control the image forming unit to perform the image forming processing; and sensors that sense a state of the image forming unit and output sensor data indicating the state of the image forming unit. The secondary controller monitors the sensor data to generate diagnostic data, and includes: a first communication unit that performs duplex communication with the primary controller to send and receive data other than the diagnostic data; and a second communication unit that sends the diagnostic data to the diagnostic server without relaying via the primary controller. The diagnostic server receives the diagnostic data from the image forming apparatus to perform failure diagnostics and lifespan diagnostics on the image forming apparatus.

An image forming apparatus diagnostic system according to one or more embodiments is an image forming apparatus diagnostic system including an image forming apparatus, a diagnostic server, and a parent diagnostic server. The image forming apparatus includes: an image forming unit that performs image forming processing on a recording sheet; a secondary controller; a primary controller that receives a job externally and issues, to the secondary controller, an instruction to monitor and control the image forming unit to perform the image forming processing; and sensors that sense a state of the image forming unit and output sensor data indicating the state of the image forming unit. The secondary controller monitors the sensor data to generate diagnostic data, and includes: a first communication unit that performs duplex communication with the primary controller to send and receive data other than the diagnostic data; and a second communication unit that sends the diagnostic data to the diagnostic server without relaying via the primary controller. The secondary controller compresses the sensor data to obtain compressed sensor data, and attaches identification data to the sensor data and the compressed sensor data, the identification data indicating a correspondence between the sensor data and the compressed sensor data. The first communication unit sends the compressed sensor data with the identification data to the parent diagnostic server via the primary controller. The second communication unit sends the sensor data with the identification data as the diagnostic data to the diagnostic server. The diagnostic server receives the diagnostic data from the image forming apparatus; refers to the diagnostic data to generate a diagnostics result of failure diagnostics and lifespan diagnostics of the image forming apparatus using a diagnostics method; attaches, to the diagnostics result, the identification data attached to the sensor data; and sends the diagnostics result with the identification data to the parent diagnostic server. The parent diagnostic server receives the compressed sensor data with the identification data from the image forming apparatus; receives the diagnostics result with the identification data from the diagnostic server; refers to the compressed sensor data and the diagnostics result to generate an analysis result; and sends the analysis result to the diagnostic server. Upon receiving the analysis result from the parent diagnostic server, the diagnostic server updates the diagnostics method based on the analysis result.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. An image forming apparatus that sends diagnostic data or sensor data to a diagnostic server, the image forming apparatus comprising:
   an image former that executes image forming processing to form an image on a sheet;
   a primary controller;
   a secondary controller that controls the image former, wherein the primary controller instructs the secondary controller to execute the image forming processing;
   a sensor that detects a state of at least a unit of the image forming apparatus and transmits sensor data indicating the state to the secondary controller;

a first transmission path for duplex communication between the secondary controller and the primary controller; and
a second transmission path different from the first transmission path, wherein
the secondary controller:
generates, from the sensor data, diagnostic data for failure diagnostics or life prediction relating to the image forming apparatus, transmits data other than the diagnostic data to the primary controller via the first transmission path, and transmits the diagnostic data to the diagnostic server, without relaying via the primary controller, via the second transmission path, or
transmits data other than the sensor data to the primary controller via the first transmission path, and transmits the sensor data to the diagnostic server, without relaying via the primary controller, via the second transmission path.

2. The image forming apparatus of claim 1, wherein the diagnostic data comprises at least one of the sensor data and data obtained by processing the sensor data.

3. The image forming apparatus of claim 1, wherein
the diagnostic server is connected to a communication network, and
the image forming apparatus further comprises:
a transceiver that sends the diagnostic data to the diagnostic server via the communication network.

4. The image forming apparatus of claim 1, wherein
the diagnostic server is connected to a communication network, and
the image forming apparatus further comprises:
a transceiver that sends the diagnostic data to the diagnostic server via a device connected to the communication network.

5. The image forming apparatus of claim 4, wherein the device is a personal computer.

6. The image forming apparatus of claim 4, wherein the device is a portable communication device.

7. The image forming apparatus of claim 4, wherein
the device is a server device that is further connected to a local area network, and
the transceiver sends the diagnostic data to the diagnostic server via the local area network and the server device.

8. The image forming apparatus of claim 1, wherein
the image forming apparatus further comprises:
a transceiver connected to the secondary controller,
the secondary controller determines whether the transceiver should send the diagnostic data to the diagnostic server, and
upon determining that the transceiver should not send the diagnostic, the secondary controller prohibits the transceiver from sending the diagnostic data to the diagnostic server.

9. The image forming apparatus of claim 1, wherein the diagnostic data comprises the sensor data outputted from the sensor, in an uncompressed format.

10. The image forming apparatus of claim 1, wherein the diagnostic data comprises compressed sensor data obtained by compressing the sensor data outputted from the sensor.

11. The image forming apparatus of claim 10, wherein
the diagnostic data further comprises the sensor data,
the sensor data and the compressed sensor data each are attached to identification data, and
the identification data indicates a correspondence between the sensor data and the compressed sensor data.

12. The image forming apparatus of claim 1, wherein
the secondary controller receives an instruction indicating whether to compress the sensor data,
when the received instruction indicates to compress the sensor data, the diagnostic data comprises the sensor data in a compressed format, and
when the received instruction indicates not to compress the sensor data, the diagnostic data comprises the sensor data in an uncompressed format.

13. The image forming apparatus of claim 1, wherein
the secondary controller compresses the sensor data to obtain compressed sensor data, and attaches identification data to the sensor data and the compressed sensor data,
the identification data indicates a correspondence between the sensor data and the compressed sensor data,
the image forming apparatus further comprises:
a first transceiver that sends the compressed sensor data as the diagnostic data to the diagnostic server via the primary controller, and
a second transceiver that sends the sensor data as the diagnostic data to the diagnostic server.

14. The image forming apparatus of claim 10, wherein the secondary controller calculates, as the compressed sensor data, at least one of a mean value, a maximum value, and a minimum value of a predefined number of pieces of the sensor data.

15. The image forming apparatus of claim 1, wherein
the image former comprises:
a feed tray that houses sheets for image formation; and
a feed roller that feeds the sheets from the feed tray, and
the diagnostic data comprises a sheet arrival period necessary for conveying each of the sheets from a first position downstream of the feed roller in a sheet conveyance direction to a second position downstream of the first position in the sheet conveyance direction.

16. The image forming apparatus of claim 1, wherein
the image former comprises a photoreceptor for toner image formation by an electrophotographic system, and
the diagnostic data comprises a surface state of the photoreceptor.

17. The image forming apparatus of claim 1, wherein
the image former comprises:
rotary members for image formation; and
driving motors that drive the rotary members to rotate, and
the diagnostic data comprises torque values of the driving motors.

18. The image forming apparatus of claim 1, wherein
the image former is a tandem-type image former, and comprises an intermediate transfer belt that conveys a toner image after a primary transfer to a secondary transfer position, and
the diagnostic data comprises a deposition amount of toner carried on the intermediate transfer belt.

19. The image forming apparatus of claim 1, wherein
the image former comprises a transfer unit that performs electrostatic transfer of a toner image onto the sheet, and
the diagnostic data comprises a transfer voltage for the electrostatic transfer.

20. An image forming apparatus diagnostic system comprising:
a diagnostic server; and
an image forming apparatus that sends diagnostic data or sensor data to the diagnostic server and comprises:
an image former that executes image forming processing to form an image on a sheet;
a primary controller;
a secondary controller that controls the image former, wherein the primary controller instructs the secondary controller to execute the image forming processing;

a sensor that detects a state of at least a unit of the image forming apparatus and transmits sensor data indicating the state to the secondary controller;

a first transmission path for duplex communication between the secondary controller and the primary controller; and a second transmission path different from the first transmission path, wherein the secondary controller:
generates, from the sensor data, diagnostic data for failure diagnostics or life prediction relating to the image forming apparatus, transmits data other than the diagnostic data to the primary controller via the first transmission path, and transmits the diagnostic data to the diagnostic server, without relaying via the primary controller, via the second transmission path, or transmits data other than the sensor data to the primary controller via the first transmission path, and transmits the sensor data to the diagnostic server, without relaying via the primary controller, via the second transmission path.

21. An image forming apparatus diagnostic system comprising:
a diagnostic server;
a parent diagnostic server; and
an image forming apparatus that sends diagnostic data or sensor data to the diagnostic server and comprises:
an image former that executes image forming processing to form an image on a sheet;
a primary controller;
a secondary controller that controls the image former, wherein the primary controller instructs the secondary controller to execute the image forming processing;
a sensor that detects a state of at least a unit of the image forming apparatus and transmits sensor data indicating the state to the secondary controller;
a first transmission path for duplex communication between the secondary controller and the primary controller; and
a second transmission path different from the first transmission path, wherein
the secondary controller:
generates, from the sensor data, diagnostic data for failure diagnostics or life prediction relating to the image forming apparatus, transmits data other than the diagnostic data to the primary controller via the first transmission path, and transmits the diagnostic data to the diagnostic server, without relaying via the primary controller, via the second transmission path, or transmits data other than the sensor data to the primary controller via the first transmission path, and transmits the sensor data to the diagnostic server, without relaying via the primary controller, via the second transmission path, the secondary controller compresses the sensor data to obtain compressed sensor data, and attaches identification data to the sensor data and the compressed sensor data, the identification data indicates a correspondence between the sensor data and the compressed sensor data, and the image forming apparatus further comprises:
a first transceiver that sends the compressed sensor data with the identification data to the parent diagnostic server via the primary controller, and
a second transceiver that sends the sensor data with the identification data as the diagnostic data to the diagnostic server, wherein the diagnostic server:
receives the diagnostic data from the image forming apparatus;
refers to the diagnostic data to generate a diagnostics result of failure diagnostics and lifespan diagnostics of the image forming apparatus using a diagnostics method;
attaches, to the diagnostics result, the identification data attached to the sensor data; and
sends the diagnostics result with the identification data to the parent diagnostic server, and the parent diagnostic server:
receives the compressed sensor data with the identification data from the image forming apparatus;
receives the diagnostics result with the identification data from the diagnostic server;
refers to the compressed sensor data and the diagnostics result to generate an analysis result; and
sends the analysis result to the diagnostic server, and upon receiving the analysis result from the parent diagnostic server, the diagnostic server updates the diagnostics method based on the analysis result.

* * * * *